United States Patent
Wang

(10) Patent No.: US 9,907,032 B2
(45) Date of Patent: Feb. 27, 2018

(54) POWER CONTROL PARAMETER CONFIGURATION BY BASE STATION

(71) Applicant: Huawei Device Co., Ltd., Shenzhen (CN)

(72) Inventor: Jian Wang, Beijing (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 0 days.

(21) Appl. No.: 14/901,793

(22) PCT Filed: May 5, 2014

(86) PCT No.: PCT/CN2014/076787
§ 371 (c)(1),
(2) Date: Dec. 29, 2015

(87) PCT Pub. No.: WO2015/168841
PCT Pub. Date: Nov. 12, 2015

(65) Prior Publication Data
US 2017/0048807 A1    Feb. 16, 2017

(51) Int. Cl.
| | |
|---|---|
| *H04W 52/04* | (2009.01) |
| *H04W 52/36* | (2009.01) |
| *H04W 52/38* | (2009.01) |
| *H04W 52/28* | (2009.01) |
| *H04W 52/34* | (2009.01) |
| *H04W 52/10* | (2009.01) |

(52) U.S. Cl.
CPC ......... *H04W 52/367* (2013.01); *H04W 52/04* (2013.01); *H04W 52/281* (2013.01); *H04W 52/34* (2013.01); *H04W 52/383* (2013.01); *H04W 52/10* (2013.01)

(58) Field of Classification Search
CPC .......................................... H04W 52/00–52/60
USPC ....................................................... 455/522
See application file for complete search history.

(56) References Cited

U.S. PATENT DOCUMENTS

| | | | |
|---|---|---|---|
| 2006/0084447 A1 | 4/2006 | Sollenberger et al. | |
| 2006/0099986 A1* | 5/2006 | Vaittinen ............ | H04W 52/367 455/522 |
| 2011/0081939 A1* | 4/2011 | Damnjanovic ....... | H04W 52/08 455/522 |

(Continued)

FOREIGN PATENT DOCUMENTS

| | | |
|---|---|---|
| CN | 101053170 A | 10/2007 |
| CN | 103270796 A | 8/2013 |

(Continued)

*Primary Examiner* — Philip Sobutka

(57) ABSTRACT

A method includes: receiving, by a UE, a power control parameter set sent by a base station, where the power control parameter set includes at least one power control parameter group, where the power control parameter group includes at least one power control parameter; determining, by the UE, a first power control parameter group according to the power control parameter set; and determining, by the UE, a transmit power of the UE according to a power control parameter in the first power control parameter group. so that the UE obtains through calculation, according to the power control parameter in the first power control parameter group, the transmit power that satisfies a service currently initiated by the UE, and a communication range of the UE is ensured.

20 Claims, 2 Drawing Sheets

---

A base station configures a power control parameter set, where the power control parameter set includes at least one power control parameter group, where the power control parameter group includes at least one power control parameter — S201

↓

The base station sends the power control parameter set to a UE, so that the UE determines a first power control group according to the power control parameter set and determines a transmit power of the UE according to a power control parameter in the first power control parameter group — S202

(56) References Cited

U.S. PATENT DOCUMENTS

| | | |
|---|---|---|
| 2012/0115534 A1 | 5/2012 | Luo et al. |
| 2012/0176923 A1* | 7/2012 | Hsu ..................... H04W 52/243 370/252 |
| 2013/0310103 A1* | 11/2013 | Madan ................ H04W 52/242 455/522 |
| 2013/0324182 A1 | 12/2013 | Deng et al. |
| 2014/0003262 A1 | 1/2014 | He et al. |
| 2014/0094213 A1 | 4/2014 | Khoshnevis et al. |
| 2014/0247796 A1 | 9/2014 | Ouchi et al. |
| 2014/0376487 A1* | 12/2014 | Iwai ..................... H04W 52/40 370/329 |

FOREIGN PATENT DOCUMENTS

| | | |
|---|---|---|
| JP | 2008017302 A | 1/2008 |
| KR | 10-2006-0008512 A | 1/2006 |
| WO | WO 2013/017948 A2 | 2/2013 |
| WO | WO 2013/047130 A1 | 4/2013 |
| WO | WO 2013/165286 A1 | 11/2013 |
| WO | 2014050010 A1 | 4/2014 |

* cited by examiner

POWER CONTROL PARAMETER CONFIGURATION BY BASE STATION

CROSS-REFERENCE TO RELATED APPLICATIONS

This application is a National Stage of International Application No. PCT/CN2014/076787, filed on May 5, 2014 which is hereby incorporated by reference in its entirety.

TECHNICAL FIELD

The present invention relates to communications technologies, and in particular, to a power control method, a user equipment, and a base station.

BACKGROUND

A proximity service between user equipments (Device to Device Proximity Service, D2D ProSe for short for short hereinafter) has become a research subject of a 3GPP LTE system Rel.12 system, and is supported in systems starting from the Rel.12 system. Because the LTE system is widely applied, a physical layer of the LTE system may be used to provide user equipment directly connected service, which may not only enrich a service range of the LTE system, but also enable user equipment directly connected (Device to Device, D2D for short hereinafter) application to be used by more users. According to ranges, D2D communication services may be classified into long-range communication services, middle-range communication services, and short-range communication services. A long-range communication service requires that a transmit power of a UE should be high, a short-range communication service requires that the transmit power of the UE should be low, and a middle-range communication service requires that the transmit power of the UE should be between the foregoing two power.

In order that better D2D communication quality can be provided for a user and that a power for sending a D2D signal by a user equipment (User Equipment, UE for short hereinafter) is prevented from exceeding a maximum transmit power allowed by the UE, it is necessary to control the transmit power when the UE sends the D2D signal. However, open-loop power control and closed-loop power control in the prior art are not suitable for direct use in a D2D communication system. For example, a long-range communication service is initiated by the UE, but the transmit power of the UE controlled by means of semi-static or static parameter configuration in the prior art is a low power, and therefore, a communication range of the UE cannot be ensured.

SUMMARY

The present invention provides a power control method, a user equipment, and a base station to solve a technical problem that power control in the prior art cannot ensure a communication range of a UE.

According to a first aspect, the present invention provides a power control method, including:

receiving, by a user equipment UE, a power control parameter set sent by a base station, where the power control parameter set includes at least one power control parameter group, where the power control parameter group includes at least one power control parameter;

determining, by the UE, a first power control parameter group according to the power control parameter set; and determining, by the UE, a transmit power of the UE according to a power control parameter in the first power control parameter group.

With reference to the first aspect, in a first possible implementation manner of the first aspect, the at least one power control parameter group includes at least one second power control parameter group, or at least one third power control parameter group and at least one second power control parameter group, or at least one third power control parameter group, where the second power control parameter group includes at least one first power control parameter, and the third power control group includes a second power control parameter, where the second power control parameter is used to instruct the UE to transmit at a maximum transmit power allowed by the UE or used to instruct the UE to transmit at a power corresponding to the second power control parameter.

With reference to the first possible implementation manner of the first aspect, in a second possible implementation manner of the first aspect, the at least one power control parameter group includes at least two second power control parameters, or at least one third power control parameter group and at least one second power control parameter group, or at least two third power control parameter groups, and the receiving, by a UE, a power control parameter set sent by a base station specifically includes:

receiving, by the UE, the power control parameter set sent by the base station, where the power control parameter set includes a first mapping relationship between a power control parameter group and a communication service; and the determining, by the UE, a first power control parameter group according to the power control parameter set specifically includes:

determining, by the UE, the first power control parameter group according to a communication service initiated by the UE and the first mapping relationship.

With reference to the first possible implementation manner of the first aspect, in a third possible implementation manner of the first aspect, the at least one power control parameter group includes at least two second power control parameters, or at least one third power control parameter group and at least one second power control parameter group, or at least two third power control parameter groups, and the receiving, by a UE, a power control parameter set sent by a base station specifically includes:

receiving, by the UE, the power control parameter set and a first identifier that are sent by the base station, where the power control parameter set includes a second mapping relationship between a power control parameter group and a power control group identifier; and the determining, by the UE, a first power control parameter group according to the power control parameter set specifically includes:

determining, by the UE, the first power control parameter group according to the first identifier and the second mapping relationship.

With reference to the first possible implementation manner of the first aspect, in a fourth possible implementation manner of the first aspect, the at least one power control parameter group includes at least two second power control parameters, or at least one third power control parameter group and at least one second power control parameter group, or at least two third power control parameter groups, and the receiving, by a UE, a power control parameter set sent by a base station specifically includes:

receiving, by the UE, the power control parameter set and a second identifier that are sent by the base station, where the power control parameter set includes at least two power control parameter groups that are configured by the base station according to a preset sequence; and the determining, by the UE, a first power control parameter group according to the power control parameter set specifically includes:

determining, by the UE, the first power control parameter group according to the second identifier and the power control parameter set.

With reference to the first possible implementation manner of the first aspect, in a fifth possible implementation manner of the first aspect, the at least one power control parameter group includes one second power control parameter group and one third power control parameter group, and the receiving, by a UE, a power control parameter set sent by a base station specifically includes:

receiving, by the UE, the power control parameter set and a third identifier that are sent by the base station; and the determining, by the UE, a first power control parameter group according to the power control parameter set specifically includes:

determining, by the UE, the first power control parameter group according to the third identifier and the power control parameter set.

With reference to the first possible implementation manner of the first aspect, in a sixth possible implementation manner of the first aspect, the at least one power control parameter group includes one second power control parameter group, and the receiving, by a UE, a power control parameter set sent by a base station specifically includes:

receiving, by the UE, the power control parameter set and a fourth identifier that are sent by the base station; and the determining, by the UE, a first power control parameter group according to the power control parameter set specifically includes:

determining, by the UE according to the fourth identifier and the power control parameter set, that the first power control parameter group includes a first power control parameter or a second power control parameter.

According to a second aspect, the present invention provides a power control method, including:

configuring, by a base station, a power control parameter set, where the power control parameter set includes at least one power control parameter group, where the power control parameter group includes at least one power control parameter; and sending, by the base station, the power control parameter set to a user equipment UE, so that the UE determines a first power control group according to the power control parameter set and determines a transmit power of the UE according to a power control parameter in the first power control parameter group.

With reference to the second aspect, in a first possible implementation manner of the second aspect, the at least one power control parameter group includes at least one second power control parameter group, or at least one third power control parameter group and at least one second power control parameter group, or at least one third power control parameter group, where the second power control parameter group includes at least one first power control parameter, and the third power control group includes a second power control parameter, where the second power control parameter is used to instruct the UE to transmit at a maximum transmit power allowed by the UE or used to instruct the UE to transmit at a power corresponding to the second power control parameter.

With reference to the first possible implementation manner of the second aspect, in a second possible implementation manner of the second aspect, the at least one power control parameter group includes at least two second power control parameters, or at least one third power control parameter group and at least one second power control parameter group, or at least two third power control parameter groups, and the sending, by the base station, the power control parameter set to a UE specifically includes:

sending, by the base station, the power control parameter set to the UE, where the power control parameter set includes a first mapping relationship between a power control parameter group and a communication service.

With reference to the first possible implementation manner of the second aspect, in a third possible implementation manner of the second aspect, the at least one power control parameter group includes at least two second power control parameters, or at least one third power control parameter group and at least one second power control parameter group, or at least two third power control parameter groups, and the sending, by the base station, the power control parameter set to a UE specifically includes:

sending, by the base station, the power control parameter set and a first identifier to the UE, where the power control parameter set includes a second mapping relationship between a power control parameter group and a power control group identifier, so that the UE determines the first power control parameter group according to the first identifier and the second mapping relationship.

With reference to the first possible implementation manner of the second aspect, in a fourth possible implementation manner of the second aspect, the at least one power control parameter group includes at least two second power control parameters, or at least one third power control parameter group and at least one second power control parameter group, or at least two third power control parameter groups, and the sending, by the base station, the power control parameter set to a UE specifically includes:

sending, by the base station, the power control parameter set and a second identifier to the UE, where the power control parameter set includes at least two power control parameter groups that are configured by the base station according to a preset sequence, so that the UE determines the first power control parameter group according to the second identifier and the power control parameter set.

With reference to the first possible implementation manner of the second aspect, in a fifth possible implementation manner of the second aspect, the at least one power control parameter group includes one second power control parameter group and one third power control parameter group, and the sending, by the base station, the power control parameter set to a UE specifically includes:

sending, by the base station, the power control parameter set and a third identifier to the UE, so that the UE determines the first power control parameter group according to the third identifier and the power control parameter set.

With reference to the first possible implementation manner of the second aspect, in a sixth possible implementation manner of the second aspect, the at least one power control parameter group includes one second power control parameter group, and the sending, by the base station, the power control parameter set to a UE specifically includes:

sending, by the base station, the power control parameter set and a fourth identifier to the UE, so that the UE determines, according to the fourth identifier and the power control parameter set, that the first power control parameter group includes a first power control parameter or a second power control parameter.

According to a third aspect, the present invention provides a user equipment, including:

a receiving module, configured to receive a power control parameter set sent by a base station, where the power control parameter set includes at least one power control parameter group, where the power control parameter group includes at least one power control parameter;

a first determining module, configured to determine a first power control parameter group according to the power control parameter set; and a second determining module, configured to determine a transmit power of the UE according to a power control parameter in the first power control parameter group.

With reference to the third aspect, in a first possible implementation manner of the third aspect, the at least one power control parameter group includes at least one second power control parameter group, or at least one third power control parameter group and at least one second power control parameter group, or at least one third power control parameter group, where the second power control parameter group includes at least one first power control parameter, and the third power control group includes a second power control parameter, where the second power control parameter is used to instruct the UE to transmit at a maximum transmit power allowed by the UE or used to instruct the UE to transmit at a power corresponding to the second power control parameter.

With reference to the first possible implementation manner of the third aspect, in a second possible implementation manner of the third aspect, the at least one power control parameter group includes at least two second power control parameters, or at least one third power control parameter group and at least one second power control parameter group, or at least two third power control parameter groups, and the receiving module is specifically configured to receive the power control parameter set sent by the base station, where the power control parameter set includes a first mapping relationship between a power control parameter group and a communication service; and the first determining module is specifically configured to determine the first power control parameter group according to a communication service initiated by the user equipment and the first mapping relationship.

With reference to the first possible implementation manner of the third aspect, in a third possible implementation manner of the third aspect, the at least one power control parameter group includes at least two second power control parameters, or at least one third power control parameter group and at least one second power control parameter group, or at least two third power control parameter groups, and the receiving module is specifically configured to receive the power control parameter set and a first identifier that are sent by the base station, where the power control parameter set includes a second mapping relationship between a power control parameter group and a power control group identifier; and the first determining module is specifically configured to determine the first power control parameter group according to the first identifier and the second mapping relationship.

With reference to the first possible implementation manner of the third aspect, in a fourth possible implementation manner of the third aspect, the at least one power control parameter group includes at least two second power control parameters, or at least one third power control parameter group and at least one second power control parameter group, or at least two third power control parameter groups, and the receiving module is specifically configured to receive the power control parameter set and a second identifier that are sent by the base station, where the power control parameter set includes at least two power control parameter groups that are configured by the base station according to a preset sequence; and the first determining module is specifically configured to determine the first power control parameter group according to the second identifier and the power control parameter set.

With reference to the first possible implementation manner of the third aspect, in a fifth possible implementation manner of the third aspect, the at least one power control parameter group includes one second power control parameter group and one third power control parameter group, and the receiving module is specifically configured to receive the power control parameter set and a third identifier that are sent by the base station; and the first determining module is specifically configured to determine the first power control parameter group according to the third identifier and the power control parameter set.

With reference to the first possible implementation manner of the third aspect, in a sixth possible implementation manner of the third aspect, the at least one power control parameter group includes one second power control parameter group, and the receiving module is specifically configured to receive the power control parameter set and a fourth identifier that are sent by the base station; and the first determining module is specifically configured to determine, according to the fourth identifier and the power control parameter set, that the first power control parameter group includes a first power control parameter or a second power control parameter.

According to a fourth aspect, the present invention provides a base station, including:

a configuring module, configured to configure a power control parameter set, where the power control parameter set includes at least one power control parameter group, where the power control parameter group includes at least one power control parameter; and a sending module, configured to send the power control parameter set to a user equipment UE, so that the UE determines a first power control group according to the power control parameter set and determines a transmit power of the UE according to a power control parameter in the first power control parameter group.

With reference to the fourth aspect, in a first possible implementation manner of the fourth aspect, the at least one power control parameter group includes at least one second power control parameter group, or at least one third power control parameter group and at least one second power control parameter group, or at least one third power control parameter group, where the second power control parameter group includes at least one first power control parameter, and the third power control group includes a second power control parameter, where the second power control parameter is used to instruct the UE to transmit at a maximum transmit power allowed by the UE or used to instruct the UE to transmit at a power corresponding to the second power control parameter.

With reference to the first possible implementation manner of the fourth aspect, in a second possible implementation manner of the fourth aspect, the at least one power control parameter group includes at least two second power control parameters, or at least one third power control parameter group and at least one second power control parameter group, or at least two third power control parameter groups; and the sending module is specifically configured to send the power control parameter set to the UE, where the power control parameter set includes a first mapping relationship between a power control parameter group and a communication service.

With reference to the first possible implementation manner of the fourth aspect, in a third possible implementation manner of the fourth aspect, the at least one power control parameter group includes at least two second power control parameters, or at least one third power control parameter group and at least one second power control parameter group, or at least two third power control parameter groups; and the sending module is specifically configured to send the power control parameter set and a first identifier to the UE, where the power control parameter set includes a second mapping relationship between a power control parameter group and a power control group identifier, so that the UE determines the first power control parameter group according to the first identifier and the second mapping relationship.

With reference to the first possible implementation manner of the fourth aspect, in a fourth possible implementation manner of the fourth aspect, the at least one power control parameter group includes at least two second power control parameters, or at least one third power control parameter group and at least one second power control parameter group, or at least two third power control parameter groups; and the sending module is specifically configured to send the power control parameter set and a second identifier to the UE, where the power control parameter set includes at least two power control parameter groups that are configured by the base station according to a preset sequence, so that the UE determines the first power control parameter group according to the second identifier and the power control parameter set.

With reference to the first possible implementation manner of the fourth aspect, in a fifth possible implementation manner of the fourth aspect, the at least one power control parameter group includes one second power control parameter group and one third power control parameter group; and the sending module is specifically configured to send the power control parameter set and a third identifier to the UE, so that the UE determines the first power control parameter group according to the third identifier and the power control parameter set.

With reference to the first possible implementation manner of the fourth aspect, in a sixth possible implementation manner of the fourth aspect, the at least one power control parameter group includes one second power control parameter group; and the sending module is specifically configured to send the power control parameter set and a fourth identifier to the UE, so that the UE determines, according to the fourth identifier and the power control parameter set, that the first power control parameter group includes a first power control parameter or a second power control parameter.

According to a fifth aspect, the present invention provides a user equipment, including:

a receiver, configured to receive a power control parameter set sent by a base station, where the power control parameter set includes at least one power control parameter group, where the power control parameter group includes at least one power control parameter; and a processor, configured to determine a first power control parameter group according to the power control parameter set, and determine a transmit power of the UE according to a power control parameter in the first power control parameter group.

With reference to the fifth aspect, in a first possible implementation manner of the fifth aspect, the at least one power control parameter group includes at least one second power control parameter group, or at least one third power control parameter group and at least one second power control parameter group, or at least one third power control parameter group, where the second power control parameter group includes at least one first power control parameter, and the third power control group includes a second power control parameter, where the second power control parameter is used to instruct the UE to transmit at a maximum transmit power allowed by the UE or used to instruct the UE to transmit at a power corresponding to the second power control parameter.

With reference to the first possible implementation manner of the fifth aspect, in a second possible implementation manner of the fifth aspect, the at least one power control parameter group includes at least two second power control parameters, or at least one third power control parameter group and at least one second power control parameter group, or at least two third power control parameter groups, and the receiver is specifically configured to receive the power control parameter set sent by the base station, where the power control parameter set includes a first mapping relationship between a power control parameter group and a communication service; and the processor is specifically configured to determine the first power control parameter group according to a communication service initiated by the user equipment and the first mapping relationship.

With reference to the first possible implementation manner of the fifth aspect, in a third possible implementation manner of the fifth aspect, the at least one power control parameter group includes at least two second power control parameters, or at least one third power control parameter group and at least one second power control parameter group, or at least two third power control parameter groups, and the receiver is specifically configured to receive the power control parameter set and a first identifier that are sent by the base station, where the power control parameter set includes a second mapping relationship between a power control parameter group and a power control group identifier; and the processor is specifically configured to determine the first power control parameter group according to the first identifier and the second mapping relationship.

With reference to the first possible implementation manner of the fifth aspect, in a fourth possible implementation manner of the fifth aspect, the at least one power control parameter group includes at least two second power control parameters, or at least one third power control parameter group and at least one second power control parameter group, or at least two third power control parameter groups, and the receiver is specifically configured to receive the power control parameter set and a second identifier that are sent by the base station, where the power control parameter set includes at least two power control parameter groups that are configured by the base station according to a preset sequence; and the processor is specifically configured to determine the first power control parameter group according to the second identifier and the power control parameter set.

With reference to the first possible implementation manner of the fifth aspect, in a fifth possible implementation manner of the fifth aspect, the at least one power control parameter group includes one second power control parameter group and one third power control parameter group, and the receiver is specifically configured to receive the power control parameter set and a third identifier that are sent by the base station; and the processor is specifically configured to determine the first power control parameter group according to the third identifier and the power control parameter set.

With reference to the first possible implementation manner of the fifth aspect, in a sixth possible implementation manner of the fifth aspect, the at least one power control parameter group includes one second power control parameter group, and the receiver is specifically configured to receive the power control parameter set and a fourth identifier that are sent by the base station; and the processor is specifically configured to determine, according to the fourth identifier and the power control parameter set, that the first power control parameter group includes a first power control parameter or a second power control parameter.

According to a sixth aspect, the present invention provides a base station, including:

a processor, configured to configure a power control parameter set, where the power control parameter set includes at least one power control parameter group, where the power control parameter group includes at least one power control parameter; and a transmitter, configured to send the power control parameter set to a user equipment UE, so that the UE determines a first power control group according to the power control parameter set and determines a transmit power of the UE according to a power control parameter in the first power control parameter group.

With reference to the sixth aspect, in a first possible implementation manner of the sixth aspect, the at least one power control parameter group includes at least one second power control parameter group, or at least one third power control parameter group and at least one second power control parameter group, or at least one third power control parameter group, where the second power control parameter group includes at least one first power control parameter, and the third power control group includes a second power control parameter, where the second power control parameter is used to instruct the UE to transmit at a maximum transmit power allowed by the UE or used to instruct the UE to transmit at a power corresponding to the second power control parameter.

With reference to the first possible implementation manner of the sixth aspect, in a second possible implementation manner of the sixth aspect, the at least one power control parameter group includes at least two second power control parameters, or at least one third power control parameter group and at least one second power control parameter group, or at least two third power control parameter groups; and the transmitter is specifically configured to send the power control parameter set to the UE, where the power control parameter set includes a first mapping relationship between a power control parameter group and a communication service.

With reference to the first possible implementation manner of the sixth aspect, in a third possible implementation manner of the sixth aspect, the at least one power control parameter group includes at least two second power control parameters, or at least one third power control parameter group and at least one second power control parameter group, or at least two third power control parameter groups; and the transmitter is specifically configured to send the power control parameter set and a first identifier to the UE, where the power control parameter set includes a second mapping relationship between a power control parameter group and a power control group identifier, so that the UE determines the first power control parameter group according to the first identifier and the second mapping relationship.

With reference to the first possible implementation manner of the sixth aspect, in a fourth possible implementation manner of the sixth aspect, the at least one power control parameter group includes at least two second power control parameters, or at least one third power control parameter group and at least one second power control parameter group, or at least two third power control parameter groups; and the transmitter is specifically configured to send the power control parameter set and a second identifier to the UE, where the power control parameter set includes at least two power control parameter groups that are configured by the base station according to a preset sequence, so that the UE determines the first power control parameter group according to the second identifier and the power control parameter set.

With reference to the first possible implementation manner of the sixth aspect, in a fifth possible implementation manner of the sixth aspect, the at least one power control parameter group includes one second power control parameter group and one third power control parameter group; and the transmitter is specifically configured to send the power control parameter set and a third identifier to the UE, so that the UE determines the first power control parameter group according to the third identifier and the power control parameter set.

With reference to the first possible implementation manner of the sixth aspect, in a sixth possible implementation manner of the sixth aspect, the at least one power control parameter group includes one second power control parameter group; and the transmitter is specifically configured to send the power control parameter set and a fourth identifier to the UE, so that the UE determines, according to the fourth identifier and the power control parameter set, that the first power control parameter group includes a first power control parameter or a second power control parameter.

According to the power control method, user equipment, and base station provided by embodiments of the present invention, the UE receives a power control parameter set sent by the base station, and determines a first power control parameter group according to the power control parameter set, so that the UE may determine a transmit power of the UE according to a power control parameter in the first power control parameter group. In the method provided by the embodiments of the present invention, the UE may determine, according to a service requirement or an instruction from the base station, the first power control parameter group to be used by the UE, so that the UE obtains through calculation, according to the power control parameter in the first power control parameter group, the transmit power that satisfies a service currently initiated by the UE, and a communication range of the UE is ensured.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

Figure 1:
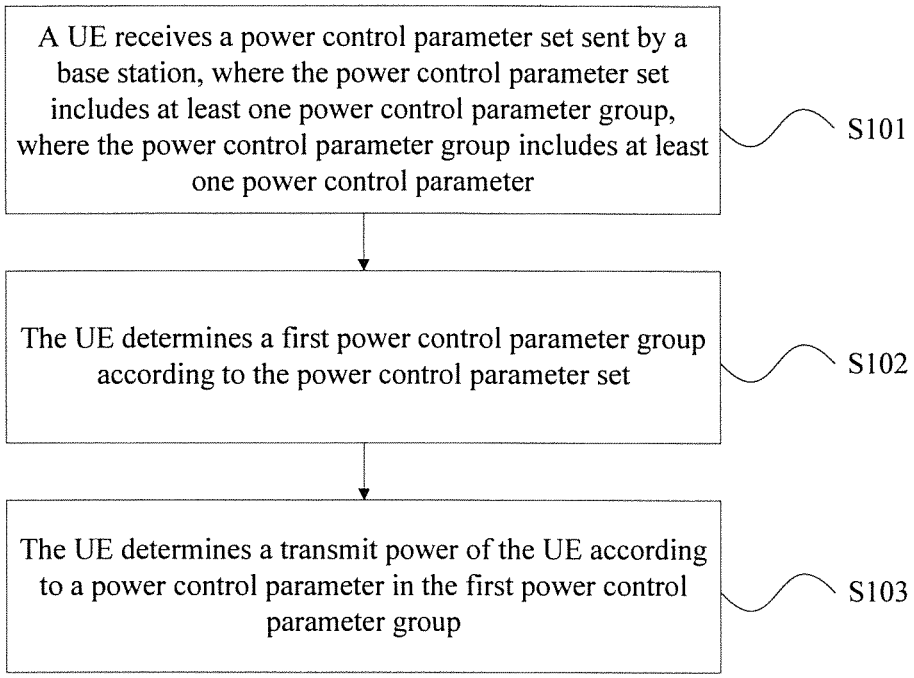
FIG. 1 is a schematic flowchart of a first embodiment of a power control method according to the present invention.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

A user equipment in the present application, that is, terminal, may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be called a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

The base station (for example, an access point) in the present application may refer to a device in communication with a wireless terminal via one or more sectors at an air interface in an access network. The base station may be configured to mutually convert a received over-the-air frame and an IP packet and serve as a router between the wireless terminal and a rest portion of the access network, where the rest portion of the access network may include an Internet protocol (IP) network. The base station may also coordinate attribute management of the air interface. For example, the base station may be a base station (BTS, Base Transceiver Station) in GSM or the CDMA, may also be a base station (NodeB) in WCDMA, and may further be an evolved NodeB (NodeB, eNB, or e-NodeB, evolutional Node B) in the LTE, which is not limited in the present application.

A method provided by an embodiment of the present invention is applicable to a D2D communication system. According to ranges, communication services in the D2D system may be classified into long-range communication services, middle-range communication services, and short-range communication services. A long-range communication service requires that a transmit power of a UE should be high, a short-range communication service requires that the transmit power of the UE should be low, and a middle-range communication service requires that the transmit power of the UE should be between the foregoing two power. That is, communication services in different ranges have different requirements for the transmit power of the UE.

FIG. 1 is a schematic flowchart of a first embodiment of a power control method according to the present invention. As shown in FIG. 1, the method includes:

S101. A UE receives a power control parameter set sent by a base station, where the power control parameter set includes at least one power control parameter group, where the power control parameter group includes at least one power control parameter.

Specifically, the base station configures the power control parameter set in advance, where the power control parameter set may include the at least one power control parameter group, where the power control parameter group includes the at least one power control parameter. After completing configuring the power control parameter set, the base station sends the power control parameter set to the UE. Optionally, the base station may send higher layer signaling carrying the power control parameter set to the UE, so that the UE may acquire the power control parameter set by using the higher layer signaling. Optionally, the higher layer signaling may be system information block (System Information Block, SIB for short hereinafter) signaling or radio resource control protocol (Radio Resource Control, RRC for short hereinafter) signaling.

It should be noted that the power control parameter set is a set of power control parameters required by the UE for calculating a transmit power of the UE. These parameters may exist in the power control parameter set in a form of a power control parameter group.

S102. The UE determines a first power control parameter group according to the power control parameter set.

S103. The UE determines a transmit power of the UE according to a power control parameter in the first power control parameter group.

Specifically, the power control parameter set may include the at least one power control parameter group, that is, the power control parameter set may include one or more power control parameter groups.

When the power control parameter set includes multiple power control parameter groups, the UE may select one power control parameter group from the multiple power control parameter groups as the first power control parameter group. Optionally, the UE may determine, according to a fact that a service initiated by the UE is a long-range communication service or a middle-range communication service or a short-range communication service or an emergency service, which power control parameter group in the power control parameter set will be selected by the UE as the first power control parameter group. Optionally, the UE may further select one power control parameter group from the multiple power control parameter groups as the first power control parameter group according to an instruction from the base station. That is, the power control parameter in the first power control parameter group is suitable for the communication service currently initiated by the UE. If the UE uses the transmit power determined according to the power control parameter in the first power control parameter group, a current communication range of the UE may be ensured.

When the power control parameter set includes one power control parameter group, the UE uses the power control parameter group as the first power control parameter group. Optionally, the power control parameter in the first power control parameter group may be a value indicating the power to be used by the UE for transmission. The value is configured by the base station for the UE based on the type of the service currently initiated by the UE. That is, if the UE may determine, by using the power control parameter in the first power control parameter group, the transmit power that is suitable for the service currently initiated by the UE, the current communication range of the UE may also be ensured.

Using open-loop power control and closed-loop power control for power control in the prior art, the base station configures only one group of static or semi-static power control parameters for the UE, and therefore, the power determined by the UE according to the group of power control parameters is fixed under a specific circumstance. However, when the service currently initiated by the UE is a long-range communication service, a low transmit power is obtained through calculation by the UE according to the static or semi-static power control parameters that are configured by the base station for the UE in this case. Therefore, the UE needs to undergo several long dynamic signaling processes (a long time is consumed) before the transmit power of the UE increases to a high power. Consequently, it takes a long time to determine the transmit power that satisfies the current communication range of the UE, affecting communication quality of the user. In addition, because $P_0$ and $PL_c$ ($P_0$ is a target power for receiving a signal by the base station, and $PL_c$ is a path loss between the UE and the base station estimated by the UE) are included in the power control parameters in the open-loop power control and the closed-loop power control, when a distance between the UE and the base station is short and $PL_c$ is low, a low transmit power is also obtained through calculation by the UE according to the static or semi-static power control parameters that are configured by the base station, and the communication range of the UE cannot be ensured.

In the power control method provided by the embodiment of the present invention, the UE receives a power control parameter set sent by the base station, and determines a first power control parameter group according to the power control parameter set, so that the UE may determine a transmit power of the UE according to a power control parameter in the first power control parameter group. In the method provided by the embodiment of the present invention, the UE may determine, according to a service requirement or an instruction from the base station, the first power control parameter group to be used by the UE, so that the UE obtains through calculation, according to the power control parameter in the first power control parameter group, the transmit power that satisfies a service currently initiated by the UE, and a communication range of the UE is ensured.

Further, the at least one power control parameter group may include at least one second power control parameter group, or at least one third power control parameter group and at least one second power control parameter group, or at least one third power control parameter group, where the second power control parameter group includes at least one first power control parameter, and the third power control group includes a second power control parameter, where the second power control parameter is used to instruct the UE to transmit at a maximum transmit power (for example, $P_{cmax}$ or $P_{power\_class}$) allowed by the UE or used to instruct the UE to transmit at a power corresponding to the second power control parameter.

Specifically, three cases may exist:

First: The at least one power control parameter group includes at least one second power control parameter group, and each second power control parameter group may include at least one first power control parameter, where the first power control parameter may be considered as a variable, where types of variables included in each second power control parameter group are the same, but values of the variables are different. The following uses a power control parameter set including two second power control parameter groups as an example for description.

For example, a power control formula for a D2D signal is as follows: $P_{D2D}=P_O+\alpha \cdot PL+\Delta$ (formula 1), where $P_{D2D}$ is a transmit power for sending the D2D signal by the UE, $P_O$ is a target power for receiving the signal by the base station, $\alpha \in \{0, 0.4, 0.5, 0.6, 0.7, 0.8, 0.9, 1\}$ is a path loss compensation coefficient, and PL is a path loss from the serving base station to the UE obtained through calculation by the UE. PL=Transmit power for sending a reference signal by a system−Receive power of the reference signal detected by the UE. $\Delta$ is an offset parametric value for power control.

Then, one second power control parameter group may include three first power control parameters $\{P_O,\alpha,\Delta\}$, where all the three first power control parameters are variables; or may include two first power control parameters $\{P_O,\alpha\}$ (this is a case in which $\Delta=0$, and $P_{D2D}=P_O+\alpha \cdot PL$, and only two variables $P_O$ and $\alpha$ exist in the formula); or may include only one first power control parameter $P_O$ (this is a case in which $\Delta=0$, $\alpha=1$, and $P_{D2D}=P_O+PL$, and only one variable $P_O$ exists in the formula). Therefore, a difference in two second power control parameter groups is represented as a difference in values of first power control parameters in the two second power control parameter groups. For example, a first power control parameter in a first one of the second power control parameter groups is specifically $\{P_O=-80\ dBm\}$, and a first power control parameter in a second one of the second power control parameter groups is specifically $\{P_O=-90\ dBm\}$.

It should be noted that in the foregoing example, a second power control parameter group including only one first power control parameter ($P_O$) is used for description. Actually, according to a configuration of the base station, both the two second power control parameter groups may include three first power control parameters ($\{P_O, \alpha, \Delta\}$), and values of the three first power control parameters in the two second power control parameter groups may be different from each other or some of the values may be the same; both the two second power control parameter groups may also include two first power control parameters ($\{P_O, \alpha\}$), and values of the two first power control parameters in the two second power control parameter groups may be different from each other or some of the values may be the same.

Therefore, when the UE receives the power control parameter set including the two second power control parameter groups, the UE selects a second power control parameter group from the two second power control parameter groups as the first power control parameter group, and determines the transmit power of the UE according to a first power control parameter in the first power control parameter group.

Second: The at least one power control parameter group includes at least one third power control parameter group and at least one second power control parameter group, where the second power control parameter group includes the at least one first power control parameter, as described in the first case, and the third power control group includes a second power control parameter, where the second power control parameter is used to instruct the UE to transmit at the maximum transmit power (for example, $P_{cmax}$ or $P_{power\_class}$) allowed by the UE or used to instruct the UE to transmit at the power corresponding to the second power control parameter. Herein, a power control parameter set including one third power control parameter group and one second power control parameter group is used as an example for description.

Specifically, the second power control parameter included in the third power control parameter group may be a specific power value of a transmit power that is configured by the base station for the UE according to a request of the UE (the transmit power that is set by the UE according to the power is suitable for the current service of the UE), or may be an identifier for instructing the UE to transmit at the maximum transmit power (for example, $P_{cmax}$ or $P_{power\_class}$) allowed by the UE (when the UE identifies the identifier, the UE transmits the signal at the maximum transmit power allowed by the UE). For the detailed description of the second power control parameter group, reference may be made to content described in the first case. No further description is provided herein.

When the UE receives the power control parameter set including one third power control parameter group and one second power control parameter group, the UE selects one from the power control parameter set as the first power control parameter group, and determines the transmit power of the UE according to a power control parameter in the first power control parameter group. When the UE selects the third power control parameter group from the power control parameter set as the first power control parameter group, the UE determines the transmit power of the UE according to the second power control parameter included in the third power control parameter group; when the UE selects the second power control parameter group from the power control parameter set as the first power control parameter group, the UE determines the transmit power of the UE according to the first power control parameter included in the selected second power control parameter group.

Third: The at least one power control parameter group includes at least one third power control parameter group, where the third power control group includes a second power control parameter, where the second power control parameter is used to instruct the UE to transmit at the maximum transmit power (for example, $P_{cmax}$ or $P_{power\_class}$) allowed by the UE or used to instruct the UE to transmit at the power corresponding to the second power control parameter. Herein, a power control parameter set including two third power control parameter groups is used as an example for description.

Specifically, when the power control parameter set includes two third power control parameter groups, both the two third power control parameter groups include second power control parameters. Optionally, functions of the two second power control parameters may be the same, or may be different. Optionally, both the second power control parameters in the two third power control parameter groups may be used to instruct the UE to transmit at powers corresponding to the second power parameters, which indicate that both the two second power control parameters notify the UE by using specific power values, and that the values of the two second power control parameters are different. Optionally, one of the second power control parameters in the two third power control parameter groups may be used to instruct the UE to transmit at the maximum transmit power (for example, $P_{cmax}$ or $P_{power\_class}$) allowed by the UE, and one may be used to instruct the UE to transmit at the power corresponding to the second power parameter.

When the UE receives the power control parameter set including two third power control parameter groups, the UE selects one third power control parameter group from the power control parameter set as the first power control parameter group, and determines the transmit power of the UE according to the second power control parameter in the selected third power control parameter group.

In the power control method provided by the embodiment of the present invention, the UE receives a power control parameter set sent by the base station, where the power control parameter set includes at least one second power control parameter group, or at least one third power control parameter group and at least one second power control parameter group, or at least one third power control parameter group. The UE determines a first power control parameter group according to the power control parameter set, so that the UE may determine a transmit power of the UE according to a power control parameter in the first power control parameter group. In the method provided by the embodiment of the present invention, the UE may determine, according to a service requirement or an instruction from the base station, the first power control parameter group to be used by the UE, so that the UE obtains through calculation, according to the power control parameter in the first power control parameter group, the transmit power that satisfies a service currently initiated by the UE, and a communication range of the UE is ensured.

On a basis of the foregoing embodiment, as a first possible implementation manner of the embodiment of the present invention, the embodiment relates to a specific process in which the UE receives a power control parameter set that is sent by the base station and includes a first mapping relationship between a power control parameter group and a communication service, and the UE determines a first power control parameter group according to a service initiated by the UE and the first mapping relationship. Further, the at least one power control parameter group includes at least two second power control parameters, or at least one third power control parameter group and at least one second power control parameter group, or at least two third power control parameter groups, and the S101 specifically includes: receiving, by the UE, the power control parameter set sent by the base station, where the power control parameter set includes the first mapping relationship between a power control parameter group and a communication service; and the S102 specifically includes: determining, by the UE, the first power control parameter group according to the communication service initiated by the UE and the first mapping relationship.

Specifically, the base station sends the configured power control parameter set to the UE, where the power control parameter set includes the first mapping relationship between a power control parameter group and a communication service. The power control parameter set may be sent to the UE by using higher layer signaling. The higher layer signaling may be SIB signaling or RRC signaling. In addition, in the power control parameter set, the first mapping relationship between a power control parameter group and a communication service varies according to the power control parameter groups included in the power control parameter set. Specifically, three cases A, B, and C may exist.

A. When the power control parameter set includes at least two second power control parameter groups, herein assuming that the power control parameter set includes three second power control parameter groups, the first mapping relationship is that each of the three second power control parameter groups is corresponding to one different communication service of the UE. For example, the first mapping relationship may be shown in Table 1. Each second power control parameter group in Table 1 includes only one first power control parameter $P_O$, and in this case, $\Delta=0$, and $\alpha=1$ (or three first power control parameters $\{P_O,\alpha,\Delta\}$ may be included, or two power control parameter groups $\{P_O,\alpha\}$ may be included, or any two or any one power control parameter in $\{P_O,\alpha,\Delta\}$ may be included, and that only $P_O$ is included is used as an example herein). Each second power control parameter group is corresponding to one different communication service.

TABLE 1

| Power control parameter group | First power control parameter | Corresponding service |
|---|---|---|
| Second power control parameter group | $\{P_O = -80\text{ dBm}\}$ | Long-range D2D communication service |
| Second power control parameter group | $\{P_O = -85\text{ dBm}\}$ | Middle-range D2D communication service |
| Second power control parameter group | $\{P_O = -90\text{ dBm}\}$ | Short-range D2D communication service |

The UE may determine, from the first mapping relationship according to the service initiated by the UE, a second power control parameter group corresponding to the service of the UE, use the second power control parameter group corresponding to the service of the UE as the first power control parameter group, and use a first power control parameter in the first power control parameter group to calculate the power for transmitting the signal. For example, if the service currently initiated by the UE is a short-range D2D communication service, the UE determines, from the first mapping relationship, that the second power control parameter group corresponding to the short-range D2D communication service is the first power control parameter group. Then the UE substitutes the first power control parameter $\{P_O=-90\text{ dBm}\}$ in the second power control parameter group into the formula $P_{D2D}=P_O+PL$, and thereby obtains the power for sending the D2D signal by the UE.

B. When the power control parameter set includes at least one third power control parameter group and at least one second power control parameter group, herein assuming that the power control parameter set includes three second power control parameter groups and one third power control parameter group, the first mapping relationship is that each of the four power control parameter groups is corresponding to one different communication service of the UE. For example, the first mapping relationship may be shown in Table 2. Each second power control parameter group in Table 2 includes only one first power control parameter $P_O$, and in this case, $\Delta=0$, and $\alpha=1$ (or three first power control parameters $\{P_O,\alpha,\Delta\}$ may be included, or two power control parameter groups $\{P_O,\alpha\}$ may be included, or any two or any one power control parameter in $\{P_O,\alpha,\Delta\}$ may be included, and that only $P_O$ is included is used as an example herein). The third power control parameter group in Table 2 includes a second power control parameter. Each second power control parameter group and the third power control parameter group are corresponding to one different communication service. The second power control parameter in Table 2 may be used to instruct the UE to transmit at the maximum transmit power (for example, $P_{cmax}$ or $P_{power\_class}$) allowed by the UE, or may be used to instruct the UE to transmit at the power corresponding to the second power control parameter. It is assumed herein that the second power control parameter is used to instruct the UE to transmit at the maximum power.

TABLE 2

| Power control parameter group | Power control parameter | Corresponding service |
|---|---|---|
| Third power control parameter group | Second power control parameter (maximum transmit power) | Emergency communication service |
| Second power control parameter group | First power control parameter $\{P_O = -80\text{ dBm}\}$ | Long-range D2D communication service |
| Second power control parameter group | First power control parameter $\{P_O = -85\text{ dBm}\}$ | Middle-range D2D communication service |
| Second power control parameter group | First power control parameter $\{P_O = -90\text{ dBm}\}$ | Short-range D2D communication service |

The UE may determine, from the first mapping relationship according to the service initiated by the UE, a power control parameter group corresponding to the service of the UE, use the power control parameter group corresponding to the service of the UE as the first power control parameter group, and use a power control parameter in the first power control parameter group to calculate the power for transmitting the signal. For example, if the service currently initiated by the UE is a short-range D2D communication service, the UE determines, from the first mapping relationship, that the second power control parameter group corresponding to the short-range D2D communication service is the first power control parameter group. Then the UE substitutes the first power control parameter $\{P_O=-90\text{ dBm}\}$ in the second power control parameter group into the formula $P_{D2D}=P_O+PL$, and thereby obtains the power for sending the D2D signal by the UE.

C. When the power control parameter set includes at least two third power control parameter groups, herein assuming that the power control parameter set includes four third power control parameter groups, the first mapping relationship is that each of the four third power control parameter groups is corresponding to one different communication service of the UE. For example, the first mapping relationship may be shown in Table 3. Each third power control parameter group in Table 3 includes a second power control parameter. Only a second power control parameter in a third power control parameter group corresponding to an emergency communication service is used to instruct the UE to transmit at the maximum power. The second power control parameters in the other third power control parameter groups are used to instruct the UE to transmit at the powers (Ptx) corresponding to the second power control parameters.

TABLE 3

| Power control parameter group | Power control parameter | Corresponding service |
|---|---|---|
| Third power control parameter group | Second power control parameter (maximum transmit power) | Emergency communication service |
| Third power control parameter group | Second power control parameter Ptx = 20 dBm | Long-range D2D communication service |
| Third power control parameter group | Second power control parameter Ptx = 17 dBm | Middle-range D2D communication service |
| Third power control parameter group | Second power control parameter Ptx = 14 dBm | Short-range D2D communication service |

The UE may determine, from the first mapping relationship according to the service initiated by the UE, a third power control parameter group corresponding to the service of the UE, use the third power control parameter group corresponding to the service of the UE as the first power control parameter group, and use a second power control parameter in the first power control parameter group to determine the power for transmitting the signal. For example, if the service currently initiated by the UE is a short-range D2D communication service, the UE determines, from the first mapping relationship, that the third power control parameter group corresponding to the short-range D2D communication service is the first power control parameter group, and then the UE sends the D2D signal at 14 dBm.

In the power control method provided by the embodiment of the present invention, the UE receives a power control parameter set sent by the base station, where the power control parameter set includes a first mapping relationship between a power control parameter group and a communication service, and the UE determines a first power control parameter group according to a communication service initiated by the UE and the first mapping relationship, so that the UE may determine a transmit power of the UE according to a power control parameter in the first power control parameter group. In the method provided by the embodiment of the present invention, the UE may determine, according to a service requirement or an instruction from the base station, the first power control parameter group to be used by the UE, so that the UE obtains through calculation, according to the power control parameter in the first power control parameter group, the transmit power that satisfies the service currently initiated by the UE, and a communication range of the UE is ensured.

On a basis of the foregoing embodiment, as a second possible implementation manner of the embodiment of the present invention, the embodiment relates to a specific process in which the UE receives a power control parameter set and a first identifier that are sent by the base station and determines a first power control parameter group according to the first identifier and a second mapping relationship between a power control parameter group and a power control group identifier, where the power control parameter set includes the second mapping relationship. Further, the at least one power control parameter group includes at least two second power control parameters, or at least one third power control parameter group and at least one second power control parameter group, or at least two third power control parameter groups, and the S101 specifically includes: receiving, by the UE, the power control parameter set and the first identifier that are sent by the base station, where the power control parameter set includes the second mapping relationship between a power control parameter group and a power control group identifier; and the S102 specifically includes: determining, by the UE, the first power control parameter group according to the first identifier and the second mapping relationship.

Specifically, the base station sends the configured power control parameter set and the first identifier to the UE, where the power control parameter set includes the second mapping relationship between a power control parameter group and a power control group identifier. The power control parameter set may be sent to the UE by using higher layer signaling. The higher layer signaling may be SIB signaling or RRC signaling. The first identifier may be sent to the UE by using RRC signaling or physical downlink control channel (Physical Downlink Control Channel, PDCCH for short hereinafter) signaling or enhanced physical downlink control channel (Enhanced Physical Downlink Control Channel, EPDCCH for short hereinafter) signaling or relay physical downlink control channel (Relay Physical Downlink Control Channel, RPDCCH for short hereinafter) signaling. In addition, in the power control parameter set, the second mapping relationship between a power control parameter group and a power control group identifier varies according to the power control parameter group included in the power control parameter set. Specifically, three cases D, E, and F may exist.

D. When the power control parameter set includes at least two second power control parameter groups, herein assuming that the power control parameter set includes three second power control parameter groups, the second mapping relationship is that each of the three second power control parameter groups is corresponding to one different power control group identifier (the power control group identifiers may be power configuration sequence numbers). For example, the second mapping relationship may be shown in Table 4. Each second power control parameter group in Table 4 includes only one first power control parameter $P_O$, and in this case, $\Delta=0$, and $\alpha=1$ (or three first power control parameters $\{P_O,\alpha,\Delta\}$ may be included, or two power control parameter groups $\{P_O,\alpha\}$ may be included, or any two or any one power control parameter in $\{P_O,\alpha,\Delta\}$ may be included, and that only $P_O$ is included is used as an example herein). Each second power control parameter group is corresponding to one different power control group identifier.

TABLE 4

| Power control group identifier | Power control parameter group | First power control parameter |
|---|---|---|
| 0 | Second power control parameter group | $\{P_O = -80$ dBm$\}$ |
| 1 | Second power control parameter group | $\{P_O = -85$ dBm$\}$ |
| 2 | Second power control parameter group | $\{P_O = -90$ dBm$\}$ |

That the base station sends the power control parameter set and the first identifier may be first sending the power control parameter set by using RRC signaling or SIB signaling, and then sending the first identifier to the UE by using RRC signaling or PDCCH signaling or EPDCCH signaling or RPDCCH; or may be first sending the first identifier by using RRC signaling or PDCCH signaling or EPDCCH signaling, and then sending the power control parameter set to the UE by using RRC signaling or SIB signaling; or may be simultaneously sending the power control parameter set and the first identifier. That is, the embodiment of the present invention does not limit a sequence of sending the power control parameter set and the first identifier. Preferably, the power control parameter set is sent before the first identifier is sent.

The UE may determine, from the second mapping relationship according to the received first identifier sent by the base station, a second power control parameter group corresponding to the first identifier, use the second power control parameter group corresponding to the first identifier as the first power control parameter group, and use a first power control parameter in the first power control parameter group to calculate the power for transmitting the signal. For example, if the first identifier received by the UE is 2, the UE finds, from the second mapping relationship, a second power control parameter group whose power control group identifier is 2, and uses the second power control parameter group as the first power control parameter group. Then the UE substitutes a first power control parameter $\{P_O=-90 \text{ dBm}\}$ in the second power control parameter group into the formula $P_{D2D}=P_O+PL$, and thereby obtains the power for sending the D2D signal by the UE. It should be noted that the first identifier is configured by the base station for the UE based on the current service of the UE. Therefore, the first power control parameter group determined by the UE according to the first identifier and the transmit power determined according to the power control parameter in the first power control parameter group can ensure a communication range of the UE.

E. When the power control parameter set includes at least one third power control parameter group and at least one second power control parameter group, herein assuming that the power control parameter set includes three second power control parameter groups and one third power control parameter group, the second mapping relationship is that each of the four power control parameter groups is corresponding to one different communication service of the UE. For example, the second mapping relationship may be shown in Table 5. Each second power control parameter group in Table 5 includes only one first power control parameter $P_O$, in this case, $\Delta=0$, and $\alpha=1$ (or three first power control parameters $\{P_O, \alpha, \Delta\}$ may be included, or two power control parameter groups $\{P_O, \alpha\}$ may be included, or any two or any one power control parameter in $\{P_O, \alpha, \Delta\}$ may be included, and that only $P_O$ is included is used as an example herein). The third power control parameter group in Table 5 includes a second power control parameter. Each second power control parameter group and the third power control parameter group are corresponding to one different power control group identifier. The second power control parameter in Table 5 may be used to instruct the UE to transmit at the maximum transmit power (for example, $P_{cmax}$ or $P_{power\_class}$) allowed by the UE, or may be used to instruct the UE to transmit at the power corresponding to the second power control parameter. It is assumed herein that the second power control parameter is used to instruct the UE to transmit at the maximum power.

TABLE 5

| Power control group identifier | Power control parameter group | Power control parameter |
|---|---|---|
| 0 | Third power control parameter group | Second power control parameter (maximum transmit power) |
| 1 | Second power control parameter group | First power control parameter $\{P_O = -80 \text{ dBm}\}$ |
| 2 | Second power control parameter group | First power control parameter $\{P_O = -85 \text{ dBm}\}$ |
| 3 | Second power control parameter group | First power control parameter $\{P_O = -90 \text{ dBm}\}$ |

The UE may determine, from the second mapping relationship according to the received first identifier sent by the base station, a power control parameter group corresponding to the first identifier, use the power control parameter group corresponding to the first identifier as the first power control parameter group, and use a power control parameter in the first power control parameter group to calculate the power for transmitting the signal. For example, if the first identifier received by the UE is 2, the UE finds, from the second mapping relationship, a power control parameter group whose power control group identifier is 2 (a second power control parameter group), and uses the second power control parameter group as the first power control parameter group. Then the UE substitutes a first power control parameter $\{P_O=-85 \text{ dBm}\}$ in the second power control parameter group into the formula $P_{D2D}=P_O+PL$, and thereby obtains the power for sending the D2D signal by the UE.

F. When the power control parameter set includes at least two third power control parameter groups, herein assuming that the power control parameter set includes four third power control parameter groups, the second mapping relationship is that each of the four third power control parameter groups is corresponding to one different communication service of the UE. For example, the second mapping relationship may be shown in Table 6. Each third power control parameter group in Table 6 includes a second power control parameter. Only a second power control parameter in a third power control parameter group whose power control group identifier is 0 is used to instruct the UE to transmit at the maximum power. The second power control parameters in the other third power control parameter groups are used to instruct the UE to transmit at the powers (Ptx) corresponding to the second power control parameters.

TABLE 6

| Power control group identifier | Power control parameter group | Power control parameter |
|---|---|---|
| 0 | Third power control parameter group | Second power control parameter (maximum transmit power) |
| 1 | Third power control parameter group | Second power control parameter Ptx = 20 dBm |
| 2 | Third power control parameter group | Second power control parameter Ptx = 17 dBm |
| 3 | Third power control parameter group | Second power control parameter Ptx = 14 dBm |

The UE may determine, from the second mapping relationship according to the received first identifier sent by the base station, a power control parameter group corresponding to the first identifier, use the power control parameter group corresponding to the first identifier as the first power control parameter group, and use a power control parameter in the first power control parameter group to calculate the power for transmitting the signal. For example, if the first identifier received by the UE is 2, the UE finds, from the second mapping relationship, a power control parameter group whose power control group identifier is 2 (a third power control parameter group), and uses the third power control parameter group as the first power control parameter group. Then the UE uses a second power control parameter (14 dBm) in the third power control parameter group to send the D2D signal.

In the power control method provided by the embodiment of the present invention, the UE receives a power control parameter set and a first identifier that are sent by the base station, where the power control parameter set includes a second mapping relationship between a power control parameter group and a power control group identifier, and the UE determines a first power control parameter group according to the first identifier and the second mapping relationship that are received by the UE, so that the UE may determine a transmit power of the UE according to a power control parameter in the first power control parameter group. In the method provided by the embodiment of the present invention, the UE may determine, according to a service requirement or an instruction from the base station, the first power control parameter group to be used by the UE, so that the UE obtains through calculation, according to the power control parameter in the first power control parameter group, the transmit power that satisfies a service currently initiated by the UE, and a communication range of the UE is ensured.

On a basis of the foregoing embodiment, as a third possible implementation manner of the embodiment of the present invention, the embodiment relates to a specific process in which the UE receives a power control parameter set and a second identifier that are sent by the base station, and determines a first power control parameter group according to the second identifier and the power control parameter set, where the power control parameter set includes at least two power control parameter groups that are configured by the base station according to a preset sequence. Further, the at least one power control parameter group includes at least two second power control parameters, or at least one third power control parameter group and at least one second power control parameter group, or at least two third power control parameter groups, and the S101 specifically includes: receiving, by the UE, the power control parameter set and the second identifier that are sent by the base station, where the power control parameter set includes at least two power control parameter groups that are configured by the base station according to the preset sequence; and the S102 specifically includes: determining, by the UE, the first power control parameter group according to the second identifier and the power control parameter set.

Specifically, the base station sends the configured power control parameter set and the second identifier to the UE, where the power control parameter set includes at least two power control parameter groups that are configured by the base station according to the preset sequence, that is, the power control parameter groups in the power control parameter set are arranged in an orderly manner. The power control parameter set may be sent to the UE by using higher layer signaling. The higher layer signaling may be SIB signaling or RRC signaling. The second identifier may be sent to the UE by using RRC signaling or PDCCH signaling or EPDCCH signaling or RPDCCH signaling. With respect to the at least two power control parameter groups that are included in the power control parameter set and configured according to the preset sequence, specifically three cases G, H, and I may exist.

G. When the power control parameter set includes at least two second power control parameter groups, the at least two second power control parameter groups in this case are configured according to the sequence. It is assumed herein that the power control parameter set includes three second power control parameter groups that are configured according to the preset sequence, as shown in Table 7. Each second power control parameter group in Table 7 includes only one first power control parameter $P_O$, and in this case, $\Delta=0$, and $\alpha=1$ (or three first power control parameters $\{P_O,\alpha,\Delta\}$ may be included, or two power control parameter groups $\{P_O,\alpha\}$ may be included, or any two or any one power control parameter in $\{P_O,\alpha,\Delta\}$ may be included, and that only $P_O$ is included is used as an example herein).

TABLE 7

| Power control parameter group | First power control parameter |
| --- | --- |
| Second power control parameter group | $\{P_O = -80\ \text{dBm}\}$ |
| Second power control parameter group | $\{P_O = -85\ \text{dBm}\}$ |
| Second power control parameter group | $\{P_O = -90\ \text{dBm}\}$ |

H. When the power control parameter set includes at least one third power control parameter group and at least one second power control parameter group, the at least one third power control parameter group and at least one second power control parameter group in this case are configured according to the sequence. It is assumed herein that the power control parameter set includes three second power control parameter groups and one third power control parameter group, as shown in Table 8. Each second power control parameter group in Table 8 includes only one first power control parameter $P_O$, and in this case, $\Delta=0$, and $\alpha=1$ (or three first power control parameters $\{P_O,\alpha,\Delta\}$ may be included, or two power control parameter groups $\{P_O,\alpha\}$ may be included, or any two or any one power control parameter in $\{P_O,\alpha,\Delta\}$ may be included, and in that only $P_O$ is included is used as an example herein). The third power control parameter group in Table 8 includes a second power control parameter.

TABLE 8

| Power control parameter group | Power control parameter |
| --- | --- |
| Third power control parameter group | Second power control parameter (maximum transmit power) |
| Second power control parameter group | First power control parameter $\{P_O = -80\ \text{dBm}\}$ |
| Second power control parameter group | First power control parameter $\{P_O = -85\ \text{dBm}\}$ |
| Second power control parameter group | First power control parameter $\{P_O = -90\ \text{dBm}\}$ |

I. When the power control parameter set includes at least two third power control parameter groups, the at least one third power control parameter group in this case is configured according to the sequence. It is assumed herein that the power control parameter set includes four third power control parameter groups, as shown in Table 9. Each third power control parameter group in Table 9 includes a second power control parameter. Only a second power control parameter in a first one of the third power control parameter groups is used to instruct the UE to transmit at the maximum power. The second power control parameters in the other third power control parameter groups are used to instruct the UE to transmit at the powers (Ptx) corresponding to the second power control parameters.

TABLE 9

| Power control parameter group | Power control parameter |
|---|---|
| Third power control parameter group | Second power control parameter (maximum transmit power) |
| Third power control parameter group | Second power control parameter Ptx = 20 dBm |
| Third power control parameter group | Second power control parameter Ptx = 17 dBm |
| Third power control parameter group | Second power control parameter Ptx = 14 dBm |

That the base station sends the power control parameter set and the second identifier may be first sending the power control parameter set by using RRC signaling or SIB signaling, and then sending the second identifier to the UE by using RRC signaling or PDCCH signaling or EPDCCH signaling or RPDCCH signaling; or may be first sending the second identifier by using RRC signaling or PDCCH signaling or EPDCCH signaling or RPDCCH signaling, and then sending the power control parameter set to the UE by using RRC signaling or SIB signaling; or may be simultaneously sending the power control parameter set and the second identifier. That is, the embodiment of the present invention does not limit a sequence of sending the power control parameter set and the second identifier. Preferably, the power control parameter set is sent before the second identifier is sent.

The UE may select a power control parameter group according to the received second identifier sent by the base station, where the second identifier is used to instruct the UE to select which power control parameter group from the power control parameter set as the first power control parameter group, and determine the transmit power of the UE according to a power control parameter in the selected power control parameter group. For example, if the power control parameter set sent by the base station and currently received by the UE is the power control parameter set in Table 8, and the UE receives the second identifier sent by the base station, assuming that the second identifier is 00, which is used to instruct the UE to select a first one of the power control parameter groups in the power control parameter set as the first power control parameter group, the UE selects the first one of the third power control parameter groups in Table 8 according to the second identifier, and sends the D2D signal at the maximum transmit power (for example, $P_{cmax}$ or $P_{power\_class}$) allowed by the UE. It should be noted that the second identifier is configured by the base station for the UE based on the current service of the UE. Therefore, the first power control parameter group determined by the UE according to the second identifier and the transmit power determined according to the power control parameter in the first power control parameter group can ensure a communication range of the UE.

In the power control method provided by the embodiment of the present invention, the UE receives a power control parameter set and a second identifier that are sent by the base station, where the power control parameter set includes at least two power control parameter groups that are configured by the base station according to a preset sequence, and the UE determines a first power control parameter group according to the second identifier and the power control parameter set that are received by the UE, so that the UE may determine a transmit power of the UE according to a power control parameter in the first power control parameter group. In the method provided by the embodiment of the present invention, the UE may determine, according to a service requirement or an instruction from the base station, the first power control parameter group to be used by the UE, so that the UE obtains through calculation, according to the power control parameter in the first power control parameter group, the transmit power that is suitable for a service currently initiated by the UE, and a communication range of the UE is ensured.

On a basis of the foregoing embodiment, as a fourth possible implementation manner of the embodiment of the present invention, the embodiment relates to a specific process in which the UE receives a power control parameter set and a third identifier that are sent by the base station, and determines a first power control parameter group according to the third identifier, where the power control parameter set includes one second power control parameter group and one third power control parameter group, and the S101 specifically includes: receiving, by the UE, the power control parameter set and the third identifier that are sent by the base station; and the S102 specifically includes: determining, by the UE, the first power control parameter group according to the third identifier and the power control parameter set.

Specifically, the base station sends the configured power control parameter set and the third identifier to the UE, where the power control parameter set includes one second power control parameter group and one third power control parameter group, and the two power control parameter groups may be arranged in a disorderly manner. The power control parameter set may be sent to the UE by using higher layer signaling. The higher layer signaling may be SIB signaling or RRC signaling. The third identifier may be sent to the UE by using RRC signaling or PDCCH signaling or EPDCCH signaling or RPDCCH signaling. The third identifier may be a default mapping relationship, instructing the UE to determine that the third power control parameter is the first power control parameter group, or instructing the UE to determine that the second power control parameter group is the first power control participating group, that is, instructing the UE to use a second power control parameter to transmit the signal or use a power determined by a first power control parameter to transmit the signal. For details about the power control parameter set, reference may be made to Table 10 and Table 11.

TABLE 10

| Power control parameter group | Power control parameter |
|---|---|
| Third power control parameter group | Second power control parameter (maximum transmit power) |
| Second power control parameter group | First power control parameter $\{P_O = -80\ dBm\}$ |

TABLE 11

| Power control parameter group | Power control parameter |
|---|---|
| Third power control parameter group | Second power control parameter Ptx = 20 dBm |
| Second power control parameter group | First power control parameter $\{P_O = -80\ dBm\}$ |

That the base station sends the power control parameter set and the third identifier may be first sending the power control parameter set by using RRC signaling or SIB signaling, and then sending the third identifier to the UE by using RRC signaling or PDCCH signaling or EPDCCH signaling or RPDCCH signaling; or may be first sending the third identifier by using RRC signaling or PDCCH signaling or EPDCCH signaling or RPDCCH signaling, and then sending the power control parameter set to the UE by using RRC signaling or SIB signaling; or may be sending simultaneously the power control parameter set and the third identifier. That is, the embodiment of the present invention does not limit a sequence of sending the power control parameter set and the third identifier. Preferably, the power control parameter set is sent before the third identifier is sent.

The UE may select a power control parameter group according to the received third identifier sent by the base station, where the third identifier is used to instruct the UE to select which power control parameter group from the power control parameter set as the first power control parameter group, and determine the transmit power of the UE according to a power control parameter in the selected power control parameter group. For example, if the power control parameter set sent by the base station and currently received by the UE is the power control parameter set in Table 10, and the UE receives the third identifier sent by the base station, assuming that the third identifier is 0, which is used to instruct the UE to select a third power control parameter group in the power control parameter set as the first power control parameter group, the UE selects the third power control parameter group in Table 10 according to the third identifier, and sends the D2D signal at the maximum transmit power (for example, $P_{cmax}$ or $P_{power\_class}$) allowed by the UE. It should be noted that the third identifier is configured by the base station for the UE based on the current service of the UE. Therefore, the first power control parameter group determined by the UE according to the third identifier and the transmit power determined according to the power control parameter in the first power control parameter group can ensure a communication range of the UE.

In the power control method provided by the embodiment of the present invention, the UE receives a power control parameter set and a third identifier that are sent by the base station, where the power control parameter set includes one second power control parameter group and one third power control parameter group, and the UE determines a first power control parameter group according to the third identifier and the power control parameter set that are received by the UE, so that the UE may determine a transmit power of the UE according to a power control parameter in the first power control parameter group. In the method provided by the embodiment of the present invention, the UE may determine, according to a service requirement or an instruction from the base station, the first power control parameter group to be used by the UE, so that the UE obtains through calculation, according to the power control parameter in the first power control parameter group, the transmit power that is suitable for a service currently initiated by the UE, and a communication range of the UE is ensured.

On a basis of the foregoing embodiment, as a fifth possible implementation manner of the embodiment of the present invention, the embodiment relates to a specific process in which the UE receives a power control parameter set sent by the base station, and determines, according to the power control parameter set, that a first power control parameter group includes a first power control parameter or includes a second power control parameter, where the power control parameter set includes one second power control parameter group. Further, the at least one power control parameter group includes one second power control parameter group, and the S101 specifically includes: receiving, by the UE, the power control parameter set and a fourth identifier that are sent by the base station; and the S102 specifically includes: determining, by the UE according to the fourth identifier and the power control parameter set, that the first power control parameter group includes a first power control parameter or a second power control parameter.

Specifically, the base station sends the configured power control parameter set and the fourth identifier to the UE, where the power control parameter set includes one second power control parameter group. The power control parameter set may be sent to the UE by using higher layer signaling. The higher layer signaling may be SIB signaling or RRC signaling. The fourth identifier may be sent to the UE by using RRC signaling or PDCCH signaling or EPDCCH signaling or RPDCCH signaling. The fourth identifier may instruct the UE to determine, according to the power control parameter set, that the first power control parameter group includes a first power control parameter or includes a second power control parameter. That is, the fourth identifier is used to instruct the UE to use the maximum transmit power (for example, $P_{cmax}$ or $P_{power\_class}$) allowed by the UE to transmit the signal or use a power determined by the first power control parameter in the second power control parameter group delivered by the base station to transmit the signal. For example, if the UE currently receives the power control parameter set sent by the base station, and the UE receives the fourth identifier sent by the base station, assuming that the fourth identifier is 0, the UE is instructed to determine, according to the power control parameter set, that the first power control parameter group includes a second power control parameter, that is, the UE is instructed to transmit the D2D signal at the maximum transmit power (for example, $P_{cmax}$ or $P_{power\_class}$) allowed by the UE. It should be noted that the fourth identifier is configured by the base station for the UE based on the current service of the UE. Therefore, the first power control parameter group determined by the UE according to the fourth identifier and the transmit power determined according to the power control parameter in the first power control parameter group can ensure a communication range of the UE.

That the base station sends the power control parameter set and the fourth identifier may be first sending the power control parameter set by using RRC signaling or SIB signaling, and then sending the fourth identifier to the UE by using RRC signaling or PDCCH signaling or EPDCCH signaling or RPDCCH signaling; or may be first sending the fourth identifier by using RRC signaling or PDCCH signaling or EPDCCH signaling or RPDCCH signaling, and then sending the power control parameter set to the UE by using RRC signaling or SIB signaling; or may be simultaneously sending the power control parameter set and the fourth identifier. That is, the embodiment of the present invention does not limit a sequence of sending the power control parameter set and the fourth identifier. Preferably, the power control parameter set is sent before the fourth identifier is sent.

In the power control method provided by the embodiment of the present invention, the UE receives a power control parameter set and a fourth identifier that are sent by the base station, where the power control parameter set includes one second control parameter group, and the UE determines, according to the fourth identifier and the power control parameter set that are received by the UE, that a first power control parameter group includes a first power control parameter or a second power control parameter, so that the UE may determine a transmit power of the UE according to a power control parameter in the first power control parameter group. In the method provided by the embodiment of the present invention, the UE may determine, according to a service requirement or an instruction from the base station, the power control parameter in the first power control parameter group to be used by the UE, so that the UE obtains through calculation, according to the power control parameter, the transmit power that is suitable for a service currently initiated by the UE, and a communication range of the UE is ensured.

Figure 2:
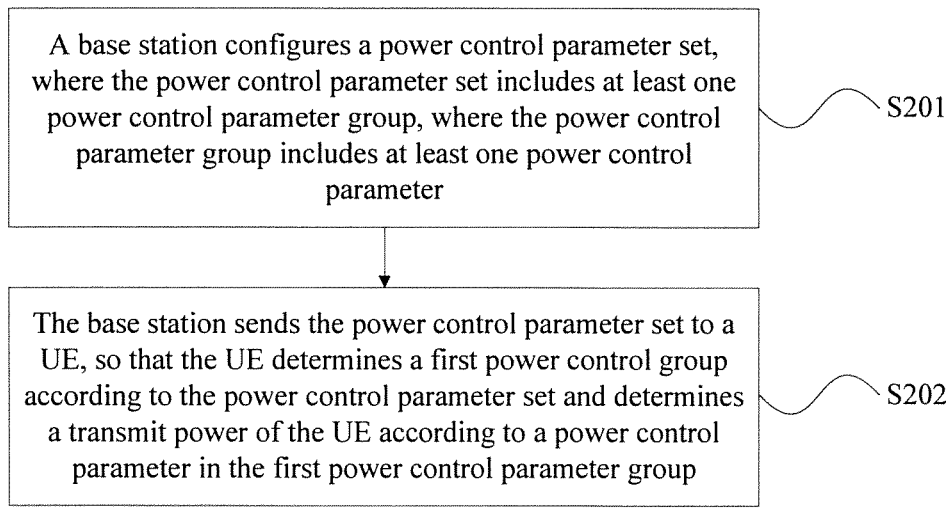
FIG. 2 is a schematic flowchart of a second embodiment of a power control method according to the present invention.

FIG. 2 is a schematic flowchart of a second embodiment of a power control method according to the present invention. The method is executed by a base station. As shown in FIG. 2, the method includes:

S201. A base station configures a power control parameter set, where the power control parameter set includes at least one power control parameter group, where the power control parameter group includes at least one power control parameter.

S202. The base station sends the power control parameter set to a UE, so that the UE determines a first power control group according to the power control parameter set and determines a transmit power of the UE according to a power control parameter in the first power control parameter group.

Specifically, the base station configures the power control parameter set in advance, where the power control parameter set may include the at least one power control parameter group, where the power control parameter group includes the at least one power control parameter. After completing configuring the power control parameter set, the base station sends the power control parameter set to the UE. Optionally, the base station may send higher layer signaling carrying the power control parameter set to the UE, so that the UE may acquire the power control parameter set by using the higher layer signaling. Optionally, the higher layer signaling may be SIB signaling or RRC signaling.

When the power control parameter set includes multiple power control parameter groups, the UE may select one power control parameter group from the multiple power control parameter groups as the first power control parameter group. Optionally, the UE may determine, according to a fact that a service initiated by the UE is a long-range communication service or a middle-range communication service or a short-range communication service or an emergency service, which power control parameter group in the power control parameter set will be selected by the UE as the first power control parameter group. Optionally, the base station may instruct the UE to select a power control parameter group from the multiple power control parameter groups as the first power control parameter group. That is, the power control parameter in the first power control parameter group is suitable for the communication service currently initiated by the UE. If the UE uses the transmit power determined according to the power control parameter in the first power control parameter group, a current communication range of the UE may be ensured.

When the power control parameter set includes one power control parameter group, the UE uses the power control parameter group as the first power control parameter group. Optionally, the power control parameter in the first power control parameter group may be a value indicating the power to be used by the UE for transmission. The value is configured by the base station for the UE based on the type of the service currently initiated by the UE. That is, if the UE may determine, by using the power control parameter in the first power control parameter group, the transmit power that is suitable for the service currently initiated by the UE, the current communication range of the UE may also be ensured.

Using open-loop power control and closed-loop power control for power control in the prior art, the base station configures only one group of static or semi-static power control parameters for the UE, and therefore, the power determined by the UE according to the group of power control parameters is fixed under a specific circumstance. However, when the service currently initiated by the UE is a long-range communication service, a low transmit power is obtained through calculation by the UE according to the static or semi-static power control parameters that are configured by the base station for the UE in this case. Therefore, the UE needs to undergo several long dynamic signaling processes (a long time is consumed) before the transmit power of the UE increases to a high power. Consequently, it takes a long time to determine the transmit power that satisfies the current communication range of the UE, affecting communication quality of the user. In addition, because $P_O$ and $PL_c$ ($P_O$ is a target power for receiving a signal by the base station, and $PL_c$ is a path loss between the UE and the base station estimated by the UE) are included in the power control parameters in the open-loop power control and the closed-loop power control, when a distance between the UE and the base station is short and $PL_c$ is low, a low transmit power is also obtained through calculation by the UE according to the static or semi-static power control parameters that are configured by the base station, and the communication range of the UE cannot be ensured.

In the power control method provided by the embodiment of the present invention, the base station configures a power control parameter set including at least one power control parameter group, and sends the power control parameter set to the UE, so that the UE determines a first power control parameter group according to the power control parameter set, and that the UE may determine a transmit power of the UE according to a power control parameter in the first power control parameter group. In the method provided by the embodiment of the present invention, the UE may determine, according to a service requirement or an instruction from the base station, the first power control parameter group to be used by the UE, so that the UE obtains through calculation, according to the power control parameter in the first power control parameter group, the transmit power that satisfies a service currently initiated by the UE, and a communication range of the UE is ensured.

Further, the at least one power control parameter group may include at least one second power control parameter group, or at least one third power control parameter group and at least one second power control parameter group, or at least one third power control parameter group, where the second power control parameter group includes at least one first power control parameter, and the third power control group includes a second power control parameter, where the second power control parameter is used to instruct the UE to transmit at a maximum transmit power (for example, $P_{cmax}$ or $P_{power\_class}$) allowed by the UE or used to instruct the UE to transmit at a power corresponding to the second power control parameter.

Specifically, three cases may exist:

First case: The at least one power control parameter group includes at least one second power control parameter group, and each second power control parameter group may include at least one first power control parameter, where the first power control parameter may be considered as a variable, where types of variables included in each second power control parameter group are the same, but values of the variables are different. The following uses a power control parameter set including two second power control parameter groups as an example for description.

For example, a power control formula for a D2D signal is as follows: $D2D=P_O+\alpha \cdot PL+\Delta$ (formula 1), where $P_{D2D}$ is a transmit power for sending the D2D signal by the UE, $P_O$ is a target power for receiving the signal by the base station, $\alpha \in \{0, 0.4, 0.5, 0.6, 0.7, 0.8, 0.9, 1\}$ is a path loss compensation coefficient, and PL is a path loss from the serving base station to the UE obtained through calculation by the UE. PL=Transmit power for sending a reference signal by a system−Receive power of the reference signal detected by the UE. $\Delta$ is an offset parametric value for power control.

Then, one second power control parameter group may include three first power control parameters $\{P_O, \alpha, \Delta\}$, where all the three first power control parameters are variables; or may include two first power control parameters $\{P_O, \alpha\}$ (this is a case in which $\Delta=0$, and $P_{D2D}=P_O+\alpha \cdot PL$, and only two variables $P_O$ and $\alpha$ exist in the formula); or may include only one first power control parameter $P_O$ (this is a case in which $\Delta=0$, $\alpha=1$, and $P_{D2D}=P_O+PL$, and only one variable $P_O$ exists in the formula). Therefore, a difference in two second power control parameter groups is represented as a difference in values of first power control parameters in the two second power control parameter groups. For example, a first power control parameter in a first one of the second power control parameter groups is specifically $\{P_O=-80 \text{ dBm}\}$, and a first power control parameter in a second one of the second power control parameter groups is specifically $\{P_O=-90 \text{ dBm}\}$.

It should be noted that in the foregoing example, a second power control parameter group including only one first power control parameter ($P_O$) is used for description. Actually, according to a configuration of the base station, both the two second power control parameter groups may include three first power control parameters ($\{P_O, \alpha, \Delta\}$), and values of the three first power control parameters in the two second power control parameter groups may be different from each other or some of the values may be the same; both the two second power control parameter groups may also include two first power control parameters ($\{P_O, \alpha\}$), and values of the two first power control parameters in the two second power control parameter groups may be different from each other or some of the values may be the same.

Therefore, when the UE receives the power control parameter set including the two second power control parameter groups, the UE selects a second power control parameter group from the two second power control parameter groups as the first power control parameter group, and determines the transmit power of the UE according to a first power control parameter in the first power control parameter group.

Second case: The at least one power control parameter group includes at least one third power control parameter group and at least one second power control parameter group, where the second power control parameter group includes the at least one first power control parameter, as described in the first case, and the third power control group includes a second power control parameter, where the second power control parameter is used to instruct the UE to transmit at the maximum transmit power (for example, $P_{cmax}$ or $P_{power\_class}$) allowed by the UE or used to instruct the UE to transmit at the power corresponding to the second power control parameter. Herein, a power control parameter set including one third power control parameter group and one second power control parameter group is used as an example for description.

Specifically, the second power control parameter included in the third power control parameter group may be a specific power value of a transmit power that is configured by the base station for the UE according to a request of the UE (the transmit power that is set by the UE according to the power is suitable for the current service of the UE), or may be an identifier for instructing the UE to transmit at the maximum transmit power (for example, $P_{cmax}$ or $P_{power\_class}$) allowed by the UE (when the UE identifies the identifier, the UE transmits the signal at the maximum transmit power allowed by the UE). For the detailed description of the second power control parameter group, reference may be made to content described in the first case. No further description is provided herein.

When the UE receives the power control parameter set including one third power control parameter group and one second power control parameter group, the UE selects one from the power control parameter set as the first power control parameter group, and determines the transmit power of the UE according to a power control parameter in the first power control parameter group. When the UE selects the third power control parameter group from the power control parameter set as the first power control parameter group, the UE determines the transmit power of the UE according to the second power control parameter included in the third power control parameter group; when the UE selects the second power control parameter group from the power control parameter set as the first power control parameter group, the UE determines the transmit power of the UE according to the first power control parameter included in the selected second power control parameter group.

Third case: The at least one power control parameter group includes at least one third power control parameter group, where the third power control group includes a second power control parameter, where the second power control parameter is used to instruct the UE to transmit at the maximum transmit power (for example, $P_{cmax}$ or $P_{power\_class}$) allowed by the UE or used to instruct the UE to transmit at the power corresponding to the second power control parameter. Herein, a power control parameter set including two third power control parameter groups is used as an example for description.

Specifically, when the power control parameter set includes two third power control parameter groups, both the two third power control parameter groups include second power control parameters. Optionally, functions of the two second power control parameters may be the same, or may be different. Optionally, both the second power control parameters in the two third power control parameter groups may be used to instruct the UE to transmit at powers corresponding to the second power parameters, which indicate that both the two second power control parameters notify the UE by using specific power values, and that the values of the two second power control parameters are different. Optionally, one of the second power control parameters in the two third power control parameter groups may be used to instruct the UE to transmit at the maximum transmit power (for example, $P_{cmax}$ or $P_{power\_class}$) allowed by the UE, and one may be used to instruct the UE to transmit at the power corresponding to the second power parameter.

When the UE receives the power control parameter set including two third power control parameter groups, the UE selects one third power control parameter group from the power control parameter set as the first power control parameter group, and determines the transmit power of the UE according to the second power control parameter in the selected third power control parameter group.

In the power control method provided by the embodiment of the present invention, the base station configures a power control parameter set including at least one second power control parameter group, or at least one third power control parameter group and at least one second power control parameter group, or at least one third power control parameter group, and sends the power control parameter set to the UE, so that the UE determines a first power control parameter group according to the power control parameter set, and that the UE may determine a transmit power of the UE according to a power control parameter in the first power control parameter group. In the method provided by the embodiment of the present invention, the UE may determine, according to a service requirement or an instruction from the base station, the first power control parameter group to be used by the UE, so that the UE obtains through calculation, according to the power control parameter in the first power control parameter group, the transmit power that satisfies a service currently initiated by the UE, and a communication range of the UE is ensured.

On a basis of the foregoing embodiment, as a possible implementation manner of the embodiment of the present invention, the embodiment relates to a specific process in which the base station sends a power control parameter set including a first mapping relationship between a power control parameter group and a communication service to the UE, so that the UE determines a first power control parameter group according to the power control parameter set and a service initiated by the UE. Further, the at least one power control parameter group includes at least two second power control parameters, or at least one third power control parameter group and at least one second power control parameter group, or at least two third power control parameter groups, and the S202 specifically includes: sending, by the base station, the power control parameter set to the UE, where the power control parameter set includes the first mapping relationship between a power control parameter group and a communication service.

Specifically, the base station configures the power control parameter set in advance, where the power control parameter set includes the first mapping relationship between a power control parameter group and a communication service. Then the base station sends the power control parameter set to the UE. The power control parameter set may be sent to the UE by using higher layer signaling. The higher layer signaling may be SIB signaling or RRC signaling. In addition, in the power control parameter set, the first mapping relationship between a power control parameter group and a communication service varies according to the power control parameter groups included in the power control parameter set. Specifically, three cases a, b, and c may exist.

a. When the power control parameter set includes at least two second power control parameter groups, herein assuming that the power control parameter set includes three second power control parameter groups, the first mapping relationship is that each of the three second power control parameter groups is corresponding to one different communication service of the UE. For example, the first mapping relationship may be shown in the Table 1. Each second power control parameter group in Table 1 includes only one first power control parameter $P_O$, in this case, $\Delta=0$, and $\alpha=1$ (or three first power control parameters $\{P_O,\alpha,\Delta\}$ may be included, or two power control parameter groups $\{P_O,\alpha\}$ may be included, or any two or any one power control parameter in $\{P_O,\alpha,\Delta\}$ may be included, and that only $P_O$ is included is used as an example herein). Each second power control parameter group is corresponding to one different communication service.

The UE may determine, from the first mapping relationship in Table 1 according to the service initiated by the UE, a second power control parameter group corresponding to the service of the UE, use the second power control parameter group corresponding to the service of the UE as the first power control parameter group, and use a first power control parameter in the first power control parameter group to calculate the power for transmitting the signal. For example, if the service currently initiated by the UE is a short-range D2D communication service, the UE determines, from the first mapping relationship, that the second power control parameter group corresponding to the short-range D2D communication service is the first power control parameter group. Then the UE substitutes the first power control parameter $\{P_O=-90\ \text{dBm}\}$ in the second power control parameter group into the formula $P_{D2D}=P_O+PL$, and thereby obtains the power for sending the D2D signal by the UE.

b. When the power control parameter set includes at least one third power control parameter group and at least one second power control parameter group, herein assuming that the power control parameter set includes three second power control parameter groups and one third power control parameter group, the first mapping relationship is that each of the four power control parameter groups is corresponding to one different communication service of the UE. For example, the first mapping relationship may be shown in the Table 2. Each second power control parameter group in Table 2 includes only one first power control parameter $P_O$, and in this case, $\Delta=0$, and $\alpha=1$ (or three first power control parameters $\{P_O,\alpha,\Delta\}$ may be included, or two power control parameter groups $\{P_O,\alpha\}$ may be included, or any two or any one power control parameter in $\{P_O,\alpha,\Delta\}$ may be included, and that only $P_O$ is included is used as an example herein). The third power control parameter group in Table 2 includes a second power control parameter. Each second power control parameter group and the third power control parameter group are corresponding to one different communication service.

The UE may determine, from the first mapping relationship shown in Table 2 according to the service initiated by the UE, a power control parameter group corresponding to the service of the UE, use the power control parameter group corresponding to the service of the UE as the first power control parameter group, and use a power control parameter in the first power control parameter group to calculate the power for transmitting the signal. For example, if the service currently initiated by the UE is a short-range D2D communication service, the UE determines, from the first mapping relationship, that the second power control parameter group corresponding to the short-range D2D communication service is the first power control parameter group. Then the UE substitutes the first power control parameter $\{P_O=-90\ \text{dBm}\}$ in the second power control parameter group into the formula $P_{D2D}\ P_O+PL$, and thereby obtains the power for sending the D2D signal by the UE.

c. When the power control parameter set includes at least two third power control parameter groups, herein assuming that the power control parameter set includes four third power control parameter groups, the first mapping relationship is that each of the four third power control parameter groups is corresponding to one different communication service of the UE. For example, the first mapping relationship may be shown in the Table 3. Each third power control parameter group in Table 3 includes a second power control parameter. Only a second power control parameter in a third power control parameter group corresponding to an emergency communication service is used to instruct the UE to transmit at the maximum power. The second power control parameters in the other third power control parameter groups are used to instruct the UE to transmit at the transmit powers (Ptx) corresponding to the second power control parameters.

The UE may determine, from the first mapping relationship shown in Table 3 according to the service initiated by the UE, a third power control parameter group corresponding to the service of the UE, use the third power control parameter group corresponding to the service of the UE as the first power control parameter group, and use a second power control parameter in the first power control parameter group to determine the power for transmitting the signal. For example, if the service currently initiated by the UE is a short-range D2D communication service, the UE determines, from the first mapping relationship, that the third power control parameter group corresponding to the short-range D2D communication service is the first power control parameter group, and then the UE sends the D2D signal at 14 dBm.

In the power control method provided by the embodiment of the present invention, the base station sends a power control parameter set including a first mapping relationship between a power control parameter group and a communication service to the UE, so that the UE determines a first power control parameter group according to a communication service initiated by the UE and the first mapping relationship, and that the UE may determine a transmit power of the UE according to a power control parameter in the first power control parameter group. In the method provided by the embodiment of the present invention, the UE may determine, according to a service requirement or an instruction from the base station, the first power control parameter group to be used by the UE, so that the UE obtains through calculation, according to the power control parameter in the first power control parameter group, the transmit power that satisfies the service currently initiated by the UE, and a communication range of the UE is ensured.

On a basis of the foregoing embodiment, as a second possible implementation manner of the embodiment of the present invention, the embodiment relates to a specific process in which the base station sends a power control parameter set and a first identifier to the UE, where includes a second mapping relationship between a power control parameter group and a power control group identifier, so that the UE determines a first power control parameter group according to the power control parameter set and the first identifier. Further, the at least one power control parameter group includes at least two second power control parameters, or at least one third power control parameter group and at least one second power control parameter group, or at least two third power control parameter groups, and the S202 specifically includes: sending, by the base station, the power control parameter set and the first identifier to the UE, where the power control parameter set includes the second mapping relationship between a power control parameter group and a power control group identifier, so that the UE determines the first power control parameter group according to the first identifier and the second mapping relationship.

Specifically, the base station configures in advance the power control parameter set including the second mapping relationship between a power control parameter group and a power control group identifier, and sends the power control parameter set and the first identifier to the UE. Optionally, the power control parameter set may be sent to the UE by using SIB signaling or RRC signaling, and the first identifier may be sent to the UE by using RRC signaling PDCCH signaling or EPDCCH signaling or RPDCCH signaling. In addition, in the power control parameter set, the second mapping relationship between a power control parameter group and a power control group identifier varies according to the power control parameter groups included in the power control parameter set. Specifically, three cases d, e, and f may exist.

d. When the power control parameter set includes at least two second power control parameter groups, herein assuming that the power control parameter set includes three second power control parameter groups, the second mapping relationship is that each of the three second power control parameter groups is corresponding to one different power control group identifier (the power control group identifiers may be power configuration sequence numbers). For example, the second mapping relationship may be shown in the Table 4. Each second power control parameter group in Table 4 includes only one first power control parameter $P_O$, and in this case, $\Delta=0$, and $\alpha=1$ (or three first power control parameters $\{P_O,\alpha,\Delta\}$ may be included, or two power control parameter groups $\{P_O,\alpha\}$ may be included, or any two or any one power control parameter in $\{P_O,\alpha,\Delta\}$ may be included, and that only $P_O$ is included is used as an example herein). Each second power control parameter group is corresponding to one different power control group identifier.

That the base station sends the power control parameter set and the first identifier may be first sending the power control parameter set by using RRC signaling or SIB signaling, and then sending the first identifier to the UE by using RRC signaling or PDCCH signaling or EPDCCH signaling or RPDCCH signaling; or may be first sending the first identifier by using RRC signaling or PDCCH signaling or EPDCCH signaling, and then sending the power control parameter set to the UE by using RRC signaling or SIB signaling; or may be simultaneously sending the power control parameter set and the first identifier. That is, the embodiment of the present invention does not limit a sequence of sending the power control parameter set and the first identifier. Preferably, the power control parameter set is sent before the first identifier is sent.

The UE may determine, from the second mapping relationship shown in Table 4 according to the received first identifier sent by the base station, a second power control parameter group corresponding to the first identifier, use the second power control parameter group corresponding to the first identifier as the first power control parameter group, and use a first power control parameter in the first power control parameter group to calculate the power for transmitting the signal. For example, if the first identifier received by the UE is 2, the UE finds, from the second mapping relationship, a second power control parameter group whose power control group identifier is 2, and uses the second power control parameter group as the first power control parameter group. Then the UE substitutes a first power control parameter {$P_O$=−90 dBm} in the second power control parameter group into the formula $P_{D2D}=P_O+PL$, and thereby obtains the power for sending the D2D signal by the UE. It should be noted that the first identifier is configured by the base station for the UE based on the current service of the UE. Therefore, the first power control parameter group determined by the UE according to the first identifier and the transmit power determined according to the power control parameter in the first power control parameter group can ensure a communication range of the UE.

e. When the power control parameter set includes at least one third power control parameter group and at least one second power control parameter group, herein assuming that the power control parameter set includes three second power control parameter groups and one third power control parameter group, the second mapping relationship is that each of the four power control parameter groups is corresponding to one different communication service of the UE. For example, the second mapping relationship may be shown in the Table 5. Each second power control parameter group in Table 5 includes only one first power control parameter $P_O$, and in this case, $\Delta=0$, and $\alpha=1$ (or three first power control parameters {$P_O,\alpha,\Delta$} may be included, or two power control parameter groups {$P_O,\alpha$} may be included, or any two or any one power control parameter in {$P_O,\alpha,\Delta$} may be included, and that only $P_O$ is included is used as an example herein). The third power control parameter group in Table 5 includes a second power control parameter. Each second power control parameter group and the third power control parameter group are corresponding to one different power control group identifier.

The UE may determine, from the second mapping relationship shown in Table 5 according to the received first identifier sent by the base station, a power control parameter group corresponding to the first identifier, use the power control parameter group corresponding to the first identifier as the first power control parameter group, and use a power control parameter in the first power control parameter group to calculate the power for transmitting the signal. For example, if the first identifier received by the UE is 2, the UE finds, from the second mapping relationship, a power control parameter group whose power control group identifier is 2 (a second power control parameter group), and uses the second power control parameter group as the first power control parameter group. Then the UE substitutes a first power control parameter {$P_O$=−85 dBm} in the second power control parameter group into the formula $P_{D2D}=P_O+PL$, and thereby obtains the power for sending the D2D signal by the UE.

f. When the power control parameter set includes at least two third power control parameter groups, herein assuming that the power control parameter set includes four third power control parameter groups, the second mapping relationship is that each of the four third power control parameter groups is corresponding to one different communication service of the UE. For example, the second mapping relationship may be shown in the Table 6. Each third power control parameter group in Table 6 includes a second power control parameter. Only a second power control parameter in a third power control parameter group whose power control group identifier is 0 is used to instruct the UE to transmit at the maximum power. The second power control parameters in the other third power control parameter groups are used to instruct the UE to transmit at the transmit powers (Ptx) corresponding to the second power control parameters.

The UE may determine, from the second mapping relationship shown in the Table 6 according to the received first identifier sent by the base station, a power control parameter group corresponding to the first identifier, use the power control parameter group corresponding to the first identifier as the first power control parameter group, and use a power control parameter in the first power control parameter group to calculate the power for transmitting the signal. For example, if the first identifier received by the UE is 2, the UE finds, from the second mapping relationship, a power control parameter group whose power control group identifier is 2 (a third power control parameter group), and uses the third power control parameter group as the first power control parameter group. Then the UE uses a second power control parameter (14 dBm) in the third power control parameter group to send the D2D signal.

In the power control method provided by the embodiment of the present invention, the base station sends a power control parameter set and a first identifier to the UE, where the power control parameter set includes a second mapping relationship between a power control parameter group and a power control group identifier, so that the UE determines a first power control parameter group according to the first identifier received by the UE and the second mapping relationship, and that the UE may determine a transmit power of the UE according to a power control parameter in the first power control parameter group. In the method provided by the embodiment of the present invention, the UE may determine, according to a service requirement or an instruction from the base station, the first power control parameter group to be used by the UE, so that the UE obtains through calculation, according to the power control parameter in the first power control parameter group, the transmit power that satisfies a service currently initiated by the UE, and a communication range of the UE is ensured.

On a basis of the foregoing embodiment, as a third possible implementation manner of the embodiment of the present invention, the embodiment relates to a specific process in which the base station sends a power control parameter set and a second identifier to the UE, where the power control parameter set includes at least two power control parameter groups that are configured by the base station according to a preset sequence, so that the UE determines a first power control parameter group according to the power control parameter set and the second identifier. Further, the at least one power control parameter group includes at least two second power control parameters, or at least one third power control parameter group and at least one second power control parameter group, or at least two third power control parameter groups, and the S202 specifically includes: sending, by the base station, the power control parameter set and the second identifier to the UE, where the power control parameter set includes at least two power control parameter groups that are configured by the base station according to the preset sequence, so that the UE determines the first power control parameter group according to the second identifier and the power control parameter set.

Specifically, the base station configures in advance the power control parameter set including at least two power control parameter groups that are configured by the base station according to the preset sequence, that is, that is, the power control parameter groups in the power control parameter set are arranged in an orderly manner; then the base station sends the power control parameter set and the second identifier to the UE. The power control parameter set may be sent to the UE by using higher layer signaling. The higher layer signaling may be SIB signaling or RRC signaling. The second identifier may be sent to the UE by using RRC signaling or PDCCH signaling or EPDCCH signaling or RPDCCH signaling. With respect to the at least two power control parameter groups that are included in the power control parameter set and configured according to the preset sequence, specifically three cases g, h, and i may exist.

g. When the power control parameter set includes at least two second power control parameter groups, the at least two second power control parameter groups in this case are configured according to the sequence. It is assumed herein that the power control parameter set includes three second power control parameter groups that are configured according to the preset sequence, as shown in the Table 7. Each second power control parameter group in Table 7 includes only one first power control parameter $P_O$, and in this case, $\Delta=0$, and $\alpha=1$ (or three first power control parameters $\{P_O,\alpha,\Delta\}$ may be included, or two power control parameter groups $\{P_O,\alpha\}$ may be included, or any two or any one power control parameter in $\{P_O,\alpha,\Delta\}$ may be included, and that only $P_O$ is included is used as an example herein).

h. When the power control parameter set includes at least one third power control parameter group and at least one second power control parameter group, the at least one third power control parameter group and at least one second power control parameter group in this case are configured according to the sequence. It is assumed herein that the power control parameter set includes three second power control parameter groups and one third power control parameter group, as shown in the Table 8. Each second power control parameter group in Table 8 includes only one first power control parameter $P_O$, and in this case, $\Delta=0$, and $\alpha=1$ (or three first power control parameters $\{P_O,\alpha,\Delta\}$ may be included, or two power control parameter groups $\{P_O,\alpha\}$ may be included, or any two or any one power control parameter in $\{P_O,\alpha,\Delta\}$ may be included, and that only $P_O$ is included is used as an example herein). The third power control parameter group in Table 8 includes a second power control parameter.

i. When the power control parameter set includes at least two third power control parameter groups, the at least one third power control parameter group in this case is configured according to the sequence. It is assumed herein that the power control parameter set includes four third power control parameter groups, as shown in the Table 9. Each third power control parameter group in Table 9 includes a second power control parameter. Only a second power control parameter in a first one of the third power control parameter groups is used to instruct the UE to transmit at the maximum power. The second power control parameters in the other third power control parameter groups are used to instruct the UE to transmit at the transmit powers (Ptx) corresponding to the second power control parameters.

That the base station sends the power control parameter set and the second identifier may be first sending the power control parameter set by using RRC signaling or SIB signaling, and then sending the second identifier to the UE by using RRC signaling or PDCCH signaling or EPDCCH signaling or RPDCCH signaling; or may be first sending the second identifier by using RRC signaling or PDCCH signaling or EPDCCH signaling or RPDCCH signaling, and then sending the power control parameter set to the UE by using RRC signaling or SIB signaling; or may be simultaneously sending the power control parameter set and the second identifier. That is, the embodiment of the present invention does not limit a sequence of sending the power control parameter set and the second identifier. Preferably, the power control parameter set is sent before the second identifier is sent.

The UE may select a power control parameter group according to the received second identifier sent by the base station, where the second identifier is used to instruct the UE to select which power control parameter group from the power control parameter set as the first power control parameter group, and determine the transmit power of the UE according to a power control parameter in the selected power control parameter group. For example, if the power control parameter set sent by the base station and currently received by the UE is the power control parameter set in Table 8, and the UE receives the second identifier sent by the base station, assuming that the second identifier is 00, which is used to instruct the UE to select a first one of the power control parameter groups in the power control parameter set as the first power control parameter group, the UE selects the first one of the third power control parameter groups in Table 8 according to the second identifier, and sends the D2D signal at the maximum transmit power (for example, $P_{cmax}$ or $P_{power\_class}$) allowed by the UE. It should be noted that the second identifier is configured by the base station for the UE based on the current service of the UE. Therefore, the first power control parameter group determined by the UE according to the second identifier and the transmit power determined according to the power control parameter in the first power control parameter group can ensure a communication range of the UE.

In the power control method provided by the embodiment of the present invention, the base station sends a power control parameter set to the UE, where the power control parameter set includes at least two power control parameter groups that are configured by the base station according to a preset sequence, so that the UE determines a first power control parameter group according to a second identifier and the power control parameter set that are received by the UE, and that the UE may determine a transmit power of the UE according to a power control parameter in the first power control parameter group. In the method provided by the embodiment of the present invention, the UE may determine, according to a service requirement or an instruction from the base station, the first power control parameter group to be used by the UE, so that the UE obtains through calculation, according to the power control parameter in the first power control parameter group, the transmit power that is suitable for a service currently initiated by the UE, and a communication range of the UE is ensured.

On a basis of the foregoing embodiment, as a fourth possible implementation manner of the embodiment of the present invention, the embodiment relates to a specific process in which the base station sends a power control parameter set and a third identifier to the UE, where the power control parameter set includes one second power control parameter group and one third power control parameter group, so that the UE determines a first power control parameter group according to the power control parameter set and the third identifier. The S202 specifically includes: sending, by the base station, the power control parameter set and the third identifier to the UE, where the power control parameter set includes one second power control parameter group and one third power control parameter group.

Specifically, the base station configures in advance the power control parameter set including one second power control parameter group and one third power control parameter group, where the two power control parameter groups may be arranged in a disorderly manner. The power control parameter set may be sent to the UE by using higher layer signaling. The higher layer signaling may be SIB signaling or RRC signaling. The third identifier may be sent to the UE by using RRC signaling or PDCCH signaling or EPDCCH signaling or RPDCCH signaling. The third identifier may be a default mapping relationship, instructing the UE to determine that the third power control parameter is the first power control parameter group, or instructing the UE to determine that the second power control parameter group is the first power control participating group, that is, instructing the UE to use a second power control parameter to transmit the signal or use a power determined by a first power control parameter to transmit the signal. For details about the power control parameter set, reference may be made to the Table 10 and Table 11.

That the base station sends the power control parameter set and the third identifier may be first sending the power control parameter set by using RRC signaling or SIB signaling, and then sending the third identifier to the UE by using RRC signaling or PDCCH signaling or EPDCCH signaling or RPDCCH signaling; or may be first sending the third identifier by using RRC signaling or PDCCH signaling or EPDCCH signaling or RPDCCH signaling, and then sending the power control parameter set to the UE by using RRC signaling or SIB signaling; or may be simultaneously sending the power control parameter set and the third identifier. That is, the embodiment of the present invention does not limit a sequence of sending the power control parameter set and the third identifier. Preferably, the power control parameter set is sent before the third identifier is sent.

The UE may select a power control parameter group according to the received third identifier sent by the base station, where the third identifier is used to instruct the UE to select which power control parameter group from the power control parameter set as the first power control parameter group, and determine the transmit power of the UE according to a power control parameter in the selected power control parameter group. For example, if the power control parameter set sent by the base station and currently received by the UE is the power control parameter set in Table 10, and the UE receives the third identifier sent by the base station, assuming that the third identifier is 0, which is used to instruct the UE to select a third power control parameter group in the power control parameter set as the first power control parameter group, the UE selects the third power control parameter group in Table 10 according to the third identifier, and sends the D2D signal at the maximum transmit power (for example, $P_{cmax}$ or $P_{power\_class}$) allowed by the UE. It should be noted that the third identifier is configured by the base station for the UE based on the current service of the UE. Therefore, the first power control parameter group determined by the UE according to the third identifier and the transmit power determined according to the power control parameter in the first power control parameter group can ensure a communication range of the UE.

In the power control method provided by the embodiment of the present invention, the base station sends a power control parameter set and a third identifier to the UE, where the power control parameter set includes one second power control parameter group and one third power control parameter group, so that the UE determines a first power control parameter group according to the third identifier and the power control parameter set that are received by the UE, and that the UE may determine a transmit power of the UE according to a power control parameter in the first power control parameter group. In the method provided by the embodiment of the present invention, the UE may determine, according to a service requirement or an instruction from the base station, the first power control parameter group to be used by the UE, so that the UE obtains through calculation, according to the power control parameter in the first power control parameter group, the transmit power that is suitable for a service currently initiated by the UE, and a communication range of the UE is ensured.

On a basis of the foregoing embodiment, as a fifth possible implementation manner of the embodiment of the present invention, the embodiment relates to a specific process in which the base station sends a power control parameter set including one second power control parameter group to the UE, and determines, according to the power control parameter set, that a first power control parameter group includes a first power control parameter or includes a second power control parameter. Further, the at least one power control parameter group includes one second power control parameter group, and the S202 specifically includes: sending, by the base station, the power control parameter set and a third identifier to the UE, where the power control parameter set includes one second power control parameter group.

Specifically, the base station configures in advance the power control parameter set including one second power control parameter group. The power control parameter set may be sent to the UE by using higher layer signaling. The higher layer signaling may be SIB signaling or RRC signaling. The fourth identifier may be sent to the UE by using RRC signaling or PDCCH signaling or EPDCCH signaling or RPDCCH signaling. The fourth identifier may instruct the UE to determine, according to the power control parameter set, that the first power control parameter group includes a first power control parameter or includes a second power control parameter. That is, the fourth identifier is used to instruct the UE to use the maximum transmit power (for example, $P_{cmax}$ or $P_{power\_class}$) allowed by the UE to transmit the signal or use a power determined by the first power control parameter in the second power control parameter group delivered by the base station to transmit the signal. For example, if the UE currently receives the power control parameter set sent by the base station, and the UE receives the fourth identifier sent by the base station, assuming that the fourth identifier is 0, the UE is instructed to determine, according to the power control parameter set, that the first power control parameter group includes a second power control parameter, that is, the UE is instructed to transmit the D2D signal at the maximum transmit power (for example, $P_{cmax}$ or $P_{power\_class}$) allowed by the UE. It should be noted that the fourth identifier is configured by the base station for the UE based on the current service of the UE. Therefore, the first power control parameter group determined by the UE according to the fourth identifier and the transmit power determined according to the power control parameter in the first power control parameter group can ensure a communication range of the UE.

That the base station sends the power control parameter set and the fourth identifier may be first sending the power control parameter set by using RRC signaling or SIB signaling, and then sending the fourth identifier to the UE by using RRC signaling or PDCCH signaling or EPDCCH signaling or RPDCCH signaling; or may be first sending the fourth identifier by using RRC signaling or PDCCH signaling or EPDCCH signaling or RPDCCH signaling, and then sending the power control parameter set to the UE by using RRC signaling or SIB signaling; or may be simultaneously sending the power control parameter set and the fourth identifier. That is, the embodiment of the present invention does not limit a sequence of sending the power control parameter set and the fourth identifier. Preferably, the power control parameter set is sent before the fourth identifier is sent.

In the power control method provided by the embodiment of the present invention, the base station sends a power control parameter set and a fourth identifier to the UE, where the power control parameter set includes one second control parameter group, and the UE determines, according to the fourth identifier and the power control parameter set that are received by the UE, that a first power control parameter group includes a first power control parameter or a second power control parameter, so that the UE may determine a transmit power of the UE according to a power control parameter in the first power control parameter group. In the method provided by the embodiment of the present invention, the UE may determine, according to a service requirement or an instruction from the base station, the power control parameter in the first power control parameter group to be used by the UE, so that the UE obtains through calculation, according to the power control parameter, the transmit power that is suitable for a service currently initiated by the UE, and a communication range of the UE is ensured.

A person of ordinary skill in the art may understand that: all or some steps in the foregoing method embodiments may be implemented by related hardware instructed by a program, where the program may be stored in a computer-readable storage medium, and when the program is executed, the steps of the included foregoing method embodiments are executed; the storage medium includes various media that may store program code, such as a ROM, a RAM, a magnetic disk, or an optical disc.

Figure 3:
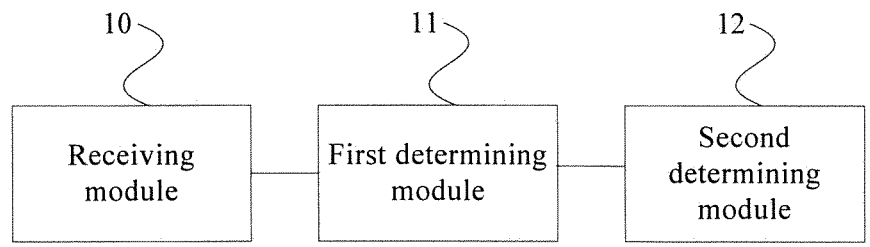
FIG. 3 is a schematic structural diagram of a first embodiment of a user equipment according to the present invention.

FIG. 3 is a schematic structural diagram of a first embodiment of a user equipment according to the present invention. As shown in FIG. 3, the user equipment includes a receiving module 10, a first determining module 11, and a second determining module 12. The receiving module 10 is configured to receive a power control parameter set sent by a base station, where the power control parameter set includes at least one power control parameter group, where the power control parameter group includes at least one power control parameter; the first determining module 11 is configured to determine a first power control parameter group according to the power control parameter set; and the second determining module 12 is configured to determine a transmit power of the UE according to a power control parameter in the first power control parameter group.

The user equipment provided by the embodiment of the present invention may execute the foregoing method embodiment of the user equipment. Implementation principles and technical effects thereof are similar, and are not further described herein.

Further, the at least one power control parameter group includes at least one second power control parameter group, or at least one third power control parameter group and at least one second power control parameter group, or at least one third power control parameter group, where the second power control parameter group includes at least one first power control parameter, and the third power control group includes a second power control parameter, where the second power control parameter is used to instruct the UE to transmit at a maximum transmit power allowed by the UE or used to instruct the UE to transmit at a power corresponding to the second power control parameter.

Optionally, the at least one power control parameter group includes at least two second power control parameters, or at least one third power control parameter group and at least one second power control parameter group, or at least two third power control parameter groups, and the receiving module 10 is specifically configured to receive the power control parameter set sent by the base station, where the power control parameter set includes a first mapping relationship between a power control parameter group and a communication service; and the first determining module 11 is specifically configured to determine the first power control parameter group according to a communication service initiated by the user equipment and the first mapping relationship.

The user equipment provided by the embodiment of the present invention may execute the foregoing method embodiment of the user equipment. Implementation principles and technical effects thereof are similar, and are not further described herein.

Optionally, the at least one power control parameter group includes at least two second power control parameters, or at least one third power control parameter group and at least one second power control parameter group, or at least two third power control parameter groups, and the receiving module 10 is specifically configured to receive the power control parameter set and a first identifier that are sent by the base station, where the power control parameter set includes a second mapping relationship between a power control parameter group and a power control group identifier; and the first determining module 11 is specifically configured to determine the first power control parameter group according to the first identifier and the second mapping relationship.

The user equipment provided by the embodiment of the present invention may execute the foregoing method embodiment of the user equipment. Implementation principles and technical effects thereof are similar, and are not further described herein.

Optionally, the at least one power control parameter group includes at least two second power control parameters, or at least one third power control parameter group and at least one second power control parameter group, or at least two third power control parameter groups, and the receiving module 10 is specifically configured to receive the power control parameter set and a second identifier that are sent by the base station, where the power control parameter set includes at least two power control parameter groups that are configured by the base station according to a preset sequence; and the first determining module 11 is specifically configured to determine the first power control parameter group according to the second identifier and the power control parameter set.

The user equipment provided by the embodiment of the present invention may execute the foregoing method embodiment of the user equipment. Implementation principles and technical effects thereof are similar, and are not further described herein.

Optionally, the at least one power control parameter group includes one second power control parameter group and one third power control parameter group, and the receiving module 10 is specifically configured to receive the power control parameter set and a third identifier that are sent by the base station; and the first determining module 11 is specifically configured to determine the first power control parameter group according to the third identifier and the power control parameter set.

The user equipment provided by the embodiment of the present invention may execute the foregoing method embodiment of the user equipment. Implementation principles and technical effects thereof are similar, and are not further described herein.

Optionally, the at least one power control parameter group includes one second power control parameter group, and the receiving module 10 is specifically configured to receive the power control parameter set and a fourth identifier that are sent by the base station; and the first determining module 11 is specifically configured to determine, according to the fourth identifier and the power control parameter set, that the first power control parameter group includes a first power control parameter or a second power control parameter.

The user equipment provided by the embodiment of the present invention may execute the foregoing method embodiment of the user equipment. Implementation principles and technical effects thereof are similar, and are not further described herein.

Figure 4:
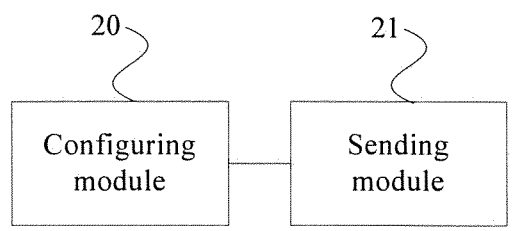
FIG. 4 is a schematic structural diagram of a first embodiment of a base station according to the present invention.

FIG. 4 is a schematic structural diagram of a first embodiment of a base station according to the present invention. As shown in FIG. 4, the base station includes a configuring module 20 and a sending module 21. The configuring module 20 is configured to configure a power control parameter set, where the power control parameter set includes at least one power control parameter group, where the power control parameter group includes at least one power control parameter; and the sending module 21 is configured to send the power control parameter set to a user equipment UE, so that the UE determines a first power control group according to the power control parameter set and determines a transmit power of the UE according to a power control parameter in the first power control parameter group.

The base station provided by the embodiment of the present invention may execute the foregoing method embodiment of the base station. Implementation principles and technical effects thereof are similar, and are not further described herein.

Further, the at least one power control parameter group includes at least one second power control parameter group, or at least one third power control parameter group and at least one second power control parameter group, or at least one third power control parameter group, where the second power control parameter group includes at least one first power control parameter, and the third power control group includes a second power control parameter, where the second power control parameter is used to instruct the UE to transmit at a maximum transmit power allowed by the UE or used to instruct the UE to transmit at a power corresponding to the second power control parameter.

Optionally, the at least one power control parameter group includes at least two second power control parameters, or at least one third power control parameter group and at least one second power control parameter group, or at least two third power control parameter groups; and the sending module 21 is specifically configured to send the power control parameter set to the UE, where the power control parameter set includes a first mapping relationship between a power control parameter group and a communication service.

The base station provided by the embodiment of the present invention may execute the foregoing method embodiment of the base station. Implementation principles and technical effects thereof are similar, and are not further described herein.

Optionally, the at least one power control parameter group includes at least two second power control parameters, or at least one third power control parameter group and at least one second power control parameter group, or at least two third power control parameter groups; and the sending module 21 is specifically configured to send the power control parameter set and a first identifier to the UE, where the power control parameter set includes a second mapping relationship between a power control parameter group and a power control group identifier, so that the UE determines the first power control parameter group according to the first identifier and the second mapping relationship.

The base station provided by the embodiment of the present invention may execute the foregoing method embodiment of the base station. Implementation principles and technical effects thereof are similar, and are not further described herein.

Optionally, the at least one power control parameter group includes at least two second power control parameters, or at least one third power control parameter group and at least one second power control parameter group, or at least two third power control parameter groups; and the sending module 21 is specifically configured to send the power control parameter set and a second identifier to the UE, where the power control parameter set includes at least two power control parameter groups that are configured by the base station according to a preset sequence, so that the UE determines the first power control parameter group according to the second identifier and the power control parameter set.

The base station provided by the embodiment of the present invention may execute the foregoing method embodiment of the base station. Implementation principles and technical effects thereof are similar, and are not further described herein.

Optionally, the at least one power control parameter group includes one second power control parameter group and one third power control parameter group; and the sending module 21 is specifically configured to send the power control parameter set and a third identifier to the UE, so that the UE determines the first power control parameter group according to the third identifier and the power control parameter set.

The base station provided by the embodiment of the present invention may execute the foregoing method embodiment of the base station. Implementation principles and technical effects thereof are similar, and are not further described herein.

Optionally, the at least one power control parameter group includes one second power control parameter group; and the sending module 21 is specifically configured to send the power control parameter set and a fourth identifier to the UE, so that the UE determines, according to the fourth identifier and the power control parameter set, that the first power control parameter group includes a first power control parameter or a second power control parameter.

The base station provided by the embodiment of the present invention may execute the foregoing method embodiment of the base station. Implementation principles and technical effects thereof are similar, and are not further described herein.

Figure 5:
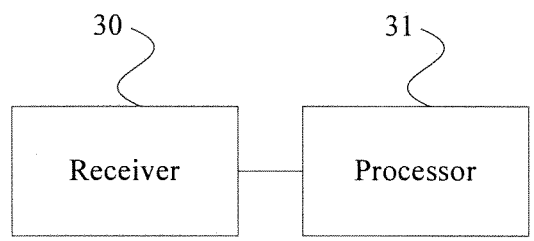
FIG. 5 is a schematic structural diagram of a second embodiment of a user equipment according to the present invention.

FIG. 5 is a schematic structural diagram of a second embodiment of a user equipment according to the present invention. As shown in FIG. 5, the user equipment includes a receiver 30 and a processor 31. The receiver 30 is configured to receive a power control parameter set sent by a base station, where the power control parameter set includes at least one power control parameter group, where the power control parameter group includes at least one power control parameter; and the processor 31 is configured to determine a first power control parameter group according to the power control parameter set, and determine a transmit power of the UE according to a power control parameter in the first power control parameter group.

The user equipment provided by the embodiment of the present invention may execute the foregoing method embodiment of the user equipment. Implementation principles and technical effects thereof are similar, and are not further described herein.

Further, the at least one power control parameter group includes at least one second power control parameter group, or at least one third power control parameter group and at least one second power control parameter group, or at least one third power control parameter group, where the second power control parameter group includes at least one first power control parameter, and the third power control group includes a second power control parameter, where the second power control parameter is used to instruct the UE to transmit at a maximum transmit power allowed by the UE or used to instruct the UE to transmit at a power corresponding to the second power control parameter.

Optionally, the at least one power control parameter group includes at least two second power control parameters, or at least one third power control parameter group and at least one second power control parameter group, or at least two third power control parameter groups, and the receiver 30 is specifically configured to receive the power control parameter set sent by the base station, where the power control parameter set includes a first mapping relationship between a power control parameter group and a communication service; and the processor 31 is specifically configured to determine the first power control parameter group according to a communication service initiated by the user equipment and the first mapping relationship.

The user equipment provided by the embodiment of the present invention may execute the foregoing method embodiment of the user equipment. Implementation principles and technical effects thereof are similar, and are not further described herein.

Optionally, the at least one power control parameter group includes at least two second power control parameters, or at least one third power control parameter group and at least one second power control parameter group, or at least two third power control parameter groups, and the receiver 30 is specifically configured to receive the power control parameter set and a first identifier that are sent by the base station, where the power control parameter set includes a second mapping relationship between a power control parameter group and a power control group identifier; and the processor 31 is specifically configured to determine the first power control parameter group according to the first identifier and the second mapping relationship.

The user equipment provided by the embodiment of the present invention may execute the foregoing method embodiment of the user equipment. Implementation principles and technical effects thereof are similar, and are not further described herein.

Optionally, the at least one power control parameter group includes at least two second power control parameters, or at least one third power control parameter group and at least one second power control parameter group, or at least two third power control parameter groups, and the receiver 30 is specifically configured to receive the power control parameter set and a second identifier that are sent by the base station, where the power control parameter set includes at least two power control parameter groups that are configured by the base station according to a preset sequence; and the processor 31 is specifically configured to determine the first power control parameter group according to the second identifier and the power control parameter set.

The user equipment provided by the embodiment of the present invention may execute the foregoing method embodiment of the user equipment. Implementation principles and technical effects thereof are similar, and are not further described herein.

Optionally, the at least one power control parameter group includes one second power control parameter group and one third power control parameter group, and the receiver 30 is specifically configured to receive the power control parameter set and a third identifier that are sent by the base station; and the processor 31 is specifically configured to determine the first power control parameter group according to the third identifier and the power control parameter set.

The user equipment provided by the embodiment of the present invention may execute the foregoing method embodiment of the user equipment. Implementation principles and technical effects thereof are similar, and are not further described herein.

Optionally, the at least one power control parameter group includes one second power control parameter group, and the receiver 30 is specifically configured to receive the power control parameter set and a fourth identifier that are sent by the base station; and the processor 31 is specifically configured to determine, according to the fourth identifier and the power control parameter set, that the first power control parameter group includes a first power control parameter or a second power control parameter.

The user equipment provided by the embodiment of the present invention may execute the foregoing method embodiment of the user equipment. Implementation principles and technical effects thereof are similar, and are not further described herein.

Figure 6:
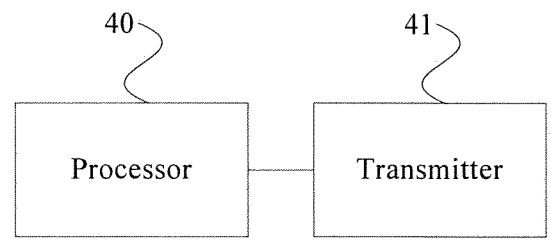
FIG. 6 is a schematic structural diagram of a second embodiment of a base station according to the present invention.

FIG. 6 is a schematic structural diagram of a second embodiment of a base station according to the present invention. As shown in FIG. 6, the base station includes a processor 40 and a transmitter 41. The processor 40 is configured to configure a power control parameter set, where the power control parameter set includes at least one power control parameter group, where the power control parameter group includes at least one power control parameter; and the transmitter 41 is configured to send the power control parameter set to a user equipment UE, so that the UE determines a first power control group according to the power control parameter set and determines a transmit power of the UE according to a power control parameter in the first power control parameter group.

The base station provided by the embodiment of the present invention may execute the foregoing method embodiment of the base station. Implementation principles and technical effects thereof are similar, and are not further described herein.

Further, the at least one power control parameter group includes at least one second power control parameter group, or at least one third power control parameter group and at least one second power control parameter group, or at least one third power control parameter group, where the second power control parameter group includes at least one first power control parameter, and the third power control group includes a second power control parameter, where the second power control parameter is used to instruct the UE to transmit at a maximum transmit power allowed by the UE or used to instruct the UE to transmit at a power corresponding to the second power control parameter.

Optionally, the at least one power control parameter group includes at least two second power control parameters, or at least one third power control parameter group and at least one second power control parameter group, or at least two third power control parameter groups; and the transmitter 41 is specifically configured to send the power control parameter set to the UE, where the power control parameter set includes a first mapping relationship between a power control parameter group and a communication service.

The base station provided by the embodiment of the present invention may execute the foregoing method embodiment of the base station. Implementation principles and technical effects thereof are similar, and are not further described herein.

Optionally, the at least one power control parameter group includes at least two second power control parameters, or at least one third power control parameter group and at least one second power control parameter group, or at least two third power control parameter groups; and the transmitter 41 is specifically configured to send the power control parameter set and a first identifier to the UE, where the power control parameter set includes a second mapping relationship between a power control parameter group and a power control group identifier, so that the UE determines the first power control parameter group according to the first identifier and the second mapping relationship.

The base station provided by the embodiment of the present invention may execute the foregoing method embodiment of the base station. Implementation principles and technical effects thereof are similar, and are not further described herein.

Optionally, the at least one power control parameter group includes at least two second power control parameters, or at least one third power control parameter group and at least one second power control parameter group, or at least two third power control parameter groups; and the transmitter 41 is specifically configured to send the power control parameter set and a second identifier to the UE, where the power control parameter set includes at least two power control parameter groups that are configured by the base station according to a preset sequence, so that the UE determines the first power control parameter group according to the second identifier and the power control parameter set.

The base station provided by the embodiment of the present invention may execute the foregoing method embodiment of the base station. Implementation principles and technical effects thereof are similar, and are not further described herein.

Optionally, the at least one power control parameter group includes one second power control parameter group and one third power control parameter group; and the transmitter 41 is specifically configured to send the power control parameter set and a third identifier to the UE, so that the UE determines the first power control parameter group according to the third identifier and the power control parameter set.

The base station provided by the embodiment of the present invention may execute the foregoing method embodiment of the base station. Implementation principles and technical effects thereof are similar, and are not further described herein.

Optionally, the at least one power control parameter group includes one second power control parameter group; and the transmitter 41 is specifically configured to send the power control parameter set and a fourth identifier to the UE, so that the UE determines, according to the fourth identifier and the power control parameter set, that the first power control parameter group includes a first power control parameter or a second power control parameter.

The base station provided by the embodiment of the present invention may execute the foregoing method embodiment of the base station. Implementation principles and technical effects thereof are similar, and are not further described herein.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A power control method, comprising:
receiving, by a user equipment (UE), a power control parameter set configured by a base station and sent by the base station, wherein the power control parameter set comprises at least one power control parameter group comprising power control parameters $P_O$, $\alpha$, and $\Delta$, $P_O$ is a target power for receiving a signal by the base station, $\alpha$ is a path loss compensation coefficient, and $\Delta$ is an offset parametric value for power control;
determining, by the UE, a first power control parameter group according to the power control parameter set; and
determining, by the UE, a device-to-device transmit power $P_{D2D}$ of the UE according to $P_{D2D} = P_O + \alpha \cdot PL + \Delta$, where PL is a path loss from the base station to the UE.

2. The method according to claim 1, wherein the at least one power control parameter group comprises:
at least one second power control parameter group; or
at least one third power control parameter group and at least one second power control parameter group; or
at least one third power control parameter group; and
wherein the second power control parameter group comprises at least one first power control parameter, and the third power control parameter group comprises a second power control parameter, wherein the second power control parameter is used to instruct the UE to transmit at a maximum transmit power allowed by the UE or used to instruct the UE to transmit at a power corresponding to the second power control parameter.

3. The method according to claim 1, wherein:
the at least one power control parameter group comprises:
at least two second power control parameters, or
at least one third power control parameter group and at least one second power control parameter group, or
at least two third power control parameter groups;
receiving, by the UE, the power control parameter set sent by the base station comprises:
receiving, by the UE, the power control parameter set sent by the base station, wherein the power control parameter set comprises a first mapping relationship between a power control parameter group and a communication service; and
determining, by the UE, the first power control parameter group according to the power control parameter set comprises:
determining, by the UE, the first power control parameter group according to a communication service initiated by the UE and the first mapping relationship.

4. The method according to claim 1, wherein:
the at least one power control parameter group comprises:
   at least two second power control parameters, or
   at least one third power control parameter group and at least one second power control parameter group, or
   at least two third power control parameter groups;
receiving, by the UE, the power control parameter set sent by the base station comprises:
   receiving, by the UE, the power control parameter set and a first identifier that are sent by the base station, wherein the power control parameter set comprises a second mapping relationship between a power control parameter group and a power control parameter group identifier; and
determining, by the UE, the first power control parameter group according to the power control parameter set comprises:
   determining, by the UE, the first power control parameter group according to the first identifier and the second mapping relationship.

5. The method according to claim 1, wherein:
the at least one power control parameter group comprises:
   at least two second power control parameters, or
   at least one third power control parameter group and at least one second power control parameter group, or
   at least two third power control parameter groups;
receiving, by the UE, the power control parameter set sent by the base station comprises:
   receiving, by the UE, the power control parameter set and a second identifier that are sent by the base station, wherein the power control parameter set comprises at least two power control parameter groups that are configured by the base station according to a preset sequence; and
determining, by the UE, the first power control parameter group according to the power control parameter set comprises:
   determining, by the UE, the first power control parameter group according to the second identifier and the power control parameter set.

6. The method according to claim 1, wherein:
the at least one power control parameter group comprises one the second power control parameter group and one the third power control parameter group;
receiving, by a UE, a power control parameter set sent by a base station comprises:
   receiving, by the UE, the power control parameter set and a third identifier that are sent by the base station; and
determining, by the UE, a first power control parameter group according to the power control parameter set comprises:
   determining, by the UE, the first power control parameter group according to the third identifier and the power control parameter set.

7. The method according to claim 1, wherein:
the at least one power control parameter group comprises one second power control parameter group;
receiving, by the UE, the power control parameter set sent by the base station comprises:
   receiving, by the UE, the power control parameter set and a fourth identifier that are sent by the base station; and
determining, by the UE, the first power control parameter group according to the power control parameter set comprises:
   determining, by the UE according to the fourth identifier and the power control parameter set, that the first power control parameter group comprises a first power control parameter or a second power control parameter.

8. A power control method, comprising:
configuring, by a base station, a power control parameter set, wherein the power control parameter set comprises at least one power control parameter group comprising power control parameters $P_O$, $\alpha$, and $\Delta$, $P_O$ is a target power for receiving a signal by the base station, $\alpha$ is a path loss compensation coefficient, and $\Delta$ is an offset parametric value for power control; and
sending, by the base station, the power control parameter set to a user equipment (UE), so that the UE determines a first power control parameter group according to the power control parameter set and determines a device-to-device transmit power $P_{D2D}$ of the UE according to $P_{D2D}=P_O+\alpha \cdot PL+\Delta$, where PL is a path loss from the base station to the UE.

9. The method according to claim 8, wherein the at least one power control parameter group comprises:
   at least one second power control parameter group; or
   at least one third power control parameter group and at least one second power control parameter group; or
   at least one third power control parameter group; and
wherein the second power control parameter group comprises at least one first power control parameter, and the third power control parameter group comprises a second power control parameter, wherein the second power control parameter is used to instruct the UE to transmit at a maximum transmit power allowed by the UE or used to instruct the UE to transmit at a power corresponding to the second power control parameter.

10. The method according to claim 8, wherein:
the at least one power control parameter group comprises:
   at least two second power control parameters, or
   at least one third power control parameter group and at least one second power control parameter group, or
   at least two third power control parameter groups; and
sending, by the base station, the power control parameter set to a UE comprises:
   sending, by the base station, the power control parameter set to the UE, wherein the power control parameter set comprises a first mapping relationship between a power control parameter group and a communication service.

11. The method according to claim 8, wherein:
the at least one power control parameter group comprises:
   at least two second power control parameters, or
   at least one third power control parameter group and at least one second power control parameter group, or
   at least two third power control parameter groups; and
sending, by the base station, the power control parameter set to a UE comprises:
   sending, by the base station, the power control parameter set and a second identifier to the UE, wherein the power control parameter set comprises at least two power control parameter groups that are configured by the base station according to a preset sequence, so that the UE determines the first power control parameter group according to the second identifier and the power control parameter set.

12. The method according to claim 8, wherein:
the at least one power control parameter group comprises one second power control parameter group and one third power control parameter group; and sending, by the base station, the power control parameter set to the UE comprises:
sending, by the base station, the power control parameter set and a third identifier to the UE, so that the UE determines the first power control parameter group according to the third identifier and the power control parameter set.

13. The method according to claim 8, wherein:
the at least one power control parameter group comprises one second power control parameter group; and
sending, by the base station, the power control parameter set to the UE comprises:
sending, by the base station, the power control parameter set and a fourth identifier to the UE, so that the UE determines, according to the fourth identifier and the power control parameter set, that the first power control parameter group comprises a first power control parameter or a second power control parameter.

14. A user equipment, comprising:
a receiver, configured to receive a power control parameter set configured by a base station and sent by the base station, wherein the power control parameter set comprises at least one power control parameter group comprising power control parameters $P_O$, $\alpha$, and $\Delta$, $P_O$ is a target power for receiving a signal by the base station, $\alpha$ is a path loss compensation coefficient, and $\Delta$ is an offset parametric value for power control; and
a processor, configured to determine a first power control parameter group according to the power control parameter set, and determine a device-to-device transmit power $P_{D2D}$ of the UE according to $P_{D2D}=P_O+\alpha\cdot PL+\Delta$, where PL is a path loss from the base station to the UE.

15. The user equipment according to claim 14, wherein the at least one power control parameter group comprises:
at least one second power control parameter group; or
at least one third power control parameter group and at least one second power control parameter group; or
at least one third power control parameter group; and
wherein the second power control parameter group comprises at least one first power control parameter, and the third power control parameter group comprises a second power control parameter, wherein the second power control parameter is used to instruct the UE to transmit at a maximum transmit power allowed by the UE or used to instruct the UE to transmit at a power corresponding to the second power control parameter.

16. The user equipment according to claim 14, wherein:
the at least one power control parameter group comprises:
at least two second power control parameters, or
at least one third power control parameter group and at least one second power control parameter group, or
at least two third power control parameter groups;
the receiver is configured to receive the power control parameter set sent by the base station, wherein the power control parameter set comprises a first mapping relationship between a power control parameter group and a communication service; and the processor is configured to determine the first power control parameter group according to a communication service initiated by the user equipment and the first mapping relationship.

17. The user equipment according to claim 14, wherein:
the at least one power control parameter group comprises:
at least two second power control parameters, or
at least one third power control parameter group and at least one second power control parameter group, or
at least two third power control parameter groups;
the receiver is configured to receive the power control parameter set and a first identifier that are sent by the base station, wherein the power control parameter set comprises a second mapping relationship between a power control parameter group and a power control parameter group identifier; and
the processor is configured to determine the first power control parameter group according to the first identifier and the second mapping relationship.

18. The user equipment according to claim 14, wherein:
the at least one power control parameter group comprises:
at least two second power control parameters, or
at least one third power control parameter group and at least one second power control parameter group, or
at least two third power control parameter groups;
the receiver is configured to receive the power control parameter set and a second identifier that are sent by the base station, wherein the power control parameter set comprises at least two power control parameter groups that are configured by the base station according to a preset sequence; and
the processor is configured to determine the first power control parameter group according to the second identifier and the power control parameter set.

19. The user equipment according to claim 14, wherein:
the at least one power control parameter group comprises one second power control parameter group and one third power control parameter group;
the receiver is configured to receive the power control parameter set and a third identifier that are sent by the base station; and
the processor is configured to determine the first power control parameter group according to the third identifier and the power control parameter set.

20. The user equipment according to claim 14, wherein:
the at least one power control parameter group comprises one second power control parameter group;
the receiver is configured to receive the power control parameter set and a fourth identifier that are sent by the base station; and
the processor is configured to determine, according to the fourth identifier and the power control parameter set, that the first power control parameter group comprises a first power control parameter or a second power control parameter.

* * * * *